United States Patent
Ishii et al.

(10) Patent No.: US 8,006,054 B2
(45) Date of Patent: Aug. 23, 2011

(54) STORAGE SYSTEM AND SNAPSHOT CONFIGURATION MIGRATION METHOD

(75) Inventors: Kenji Ishii, Ninomiya (JP); Yusuke Nonaka, Sagamihara (JP); Koji Nagata, Kaisei (JP)

(73) Assignee: Hitachi, Ltd., Toyko (JP)

( * ) Notice: Subject to any disclaimer, the term of this patent is extended or adjusted under 35 U.S.C. 154(b) by 633 days.

(21) Appl. No.: 12/076,177

(22) Filed: Mar. 14, 2008

(65) Prior Publication Data
US 2009/0193206 A1 Jul. 30, 2009

(30) Foreign Application Priority Data

Jan. 29, 2008 (JP) ................... 2008-017966

(51) Int. Cl.
G06F 13/00 (2006.01)
(52) U.S. Cl. ....................... 711/162; 711/165
(58) Field of Classification Search .......... 711/161–162, 711/165
See application file for complete search history.

(56) References Cited

U.S. PATENT DOCUMENTS

| | | | | |
|---|---|---|---|---|
| 6,193,339 | B1 * | 2/2001 | Behl et al. | 312/223.2 |
| 7,124,267 | B2 * | 10/2006 | Morishita et al. | 711/165 |
| 2003/0145169 | A1 | 7/2003 | Nagasawa et al. | |
| 2005/0223170 | A1 * | 10/2005 | Ushijima et al. | 711/114 |
| 2007/0260833 | A1 | 11/2007 | Nagata et al. | |

FOREIGN PATENT DOCUMENTS

| | | | |
|---|---|---|---|
| JP | 11-184641 | | 12/1997 |
| JP | 2007-213345 | | 2/2006 |
| JP | 2006179430 | * | 6/2006 |
| JP | 2006020535 | * | 8/2007 |

OTHER PUBLICATIONS

Machine Translation of JP2006179430.*
Machine Translation of JP2006020535.*

* cited by examiner

*Primary Examiner* — Jared I Rutz
(74) *Attorney, Agent, or Firm* — Volpe and Koenig, P.C.

(57) ABSTRACT

A migration controller 4C creates, inside a migration-destination storage controller 2, a migration-destination volume 7A, a migration-destination snapshot volume 7B and a pool 7C corresponding to a migration-source volume 5A, a migration-source snapshot volume 5B, and a pool 5C, respectively. The migration controller 4C reproduces an update history of a migration-targeted generation as a write process of difference data to the migration-destination volume 7A. The migration-destination storage controller 2 constructs the migration-destination snapshot volume 7B in accordance with the update of the migration-destination volume 7A.

11 Claims, 15 Drawing Sheets

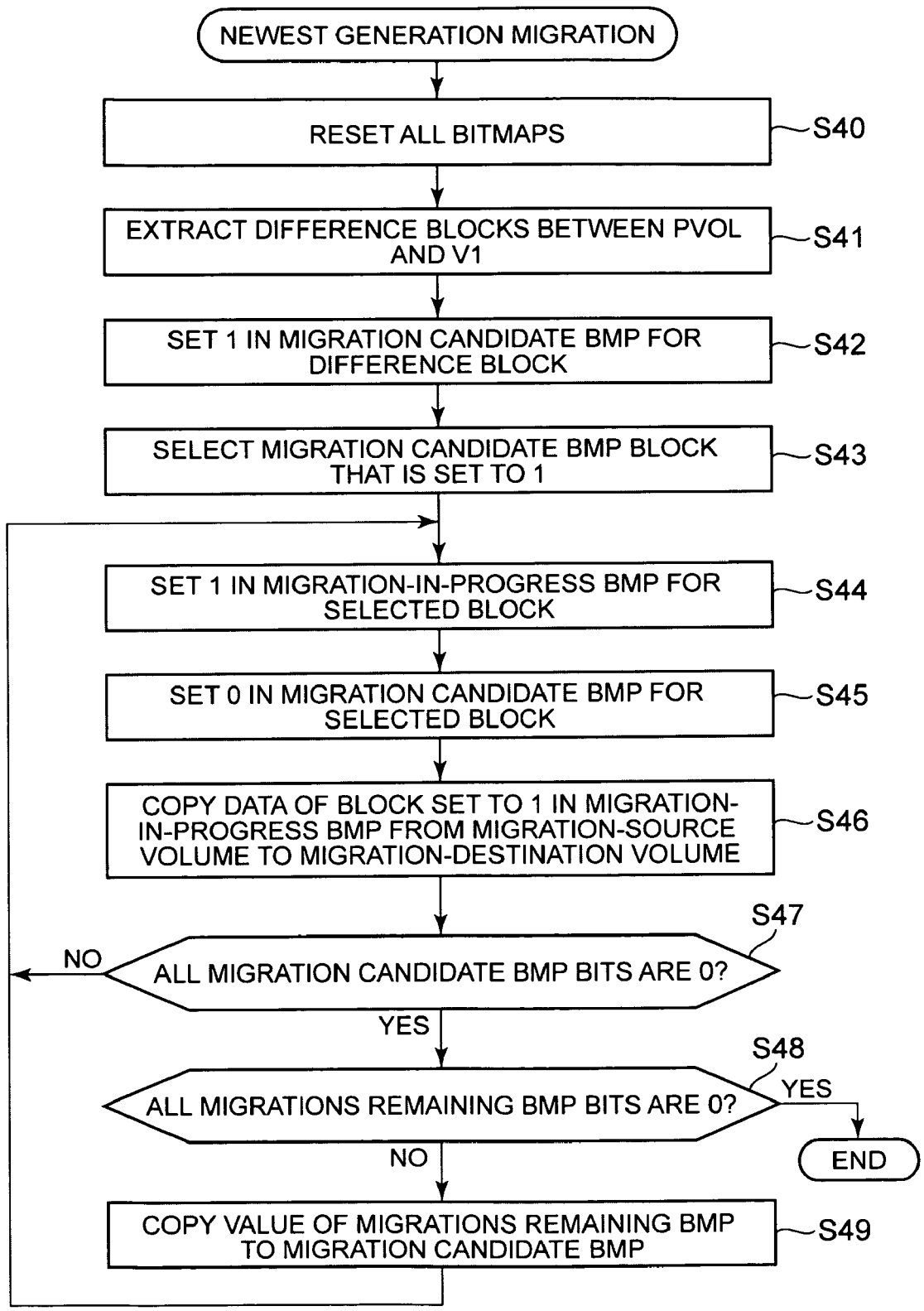

STORAGE SYSTEM AND SNAPSHOT CONFIGURATION MIGRATION METHOD

CROSS-REFERENCE TO PRIOR APPLICATION

This application relates to and claims the benefit of priority from Japanese Patent Application number 2008-17966, filed on Jan. 29, 2008, the entire disclosure of which is incorporated herein by reference.

BACKGROUND OF THE INVENTION

1. Field of the Invention

The present invention relates to a storage system and a snapshot configuration migration method.

2. Description of the Related Art

A storage controller, which configures a storage system, provides a host computer (hereinafter, host) with a relatively large capacity storage area. The storage controller, for example, is capable of creating a redundant storage area by configuring storage devices, such as hard disk devices, based on RAID (Redundant Array of Independent Disks). The host utilizes a logical volume disposed on top of this redundant storage area.

Now then, an existing old storage controller may be replaced by a new storage controller due to device obsolescence or for maintenance purposes. In this case, the data managed by the old storage controller will be migrated to the new storage controller (see Japanese Patent Laid-open No. H11-184641).

Furthermore, a snapshot function, by which a data image of a volume at a prescribed point in time can be managed by managing the volume update location and pre-update old data, is also known (see Japanese Patent Laid-open No. 2007-213345).

When the old storage controller is replaced with a new storage controller, it is not enough to simply migrate the data managed by the old storage controller to the new storage controller. When the snapshot function is being used in the old storage controller, the configuration related to the snapshot must also be migrated from the old storage controller to the new storage controller.

Now the snapshot management information and such stored in the old storage controller could be transferred to the new storage controller, but a special mechanism for migrating the snapshot configuration would have to be added to both the old storage controller and the new storage controller in this case, making the migration process complicated.

Storage controllers have grown quite popular in recent years, and the migration from an old storage controller to a new storage controller using a less expensive and simpler configuration is required. However, a migration method according to the prior art requires a special dedicated function for passing the snapshot configuration on to the new storage controller, making it impossible to respond to market demands.

SUMMARY OF THE INVENTION

With the foregoing in view, an object of the present invention is to provide a storage system and a snapshot configuration migration method capable of easily migrating data and a snapshot configuration from a first storage controller to a second storage controller using a simpler configuration. Another object of the present invention is to provide a storage system and a snapshot configuration migration method capable of using a snapshot function of the second storage controller to migrate the snapshot configuration by reproducing in the migration-destination second storage controller an update request when a snapshot is created in the migration-source first storage controller. Yet other objects of the present invention should become clear from the description of the embodiment explained hereinbelow.

A storage system according to a first aspect of the present invention for solving the above-mentioned problems is a storage system, which comprises a first storage controller and a second storage controller, and the first storage controller comprises a first volume, which is used by a host computer; at least one first snapshot volume for storing the storage contents of this first volume at a prescribed point in time as an image; and a first snapshot controller, which is for managing a difference related to the first volume, and which, when the first volume is updated, saves update targeted data to a prescribed generation first snapshot volume of the respective first snapshot volumes, and manages an update location in the first volume, the second storage controller comprises a second volume; at least one second snapshot volume for storing the storage contents of this second volume at a prescribed point in time as an image; and a second snapshot controller, which is for managing a difference related to the second volume, and which, when the second volume is updated, saves update targeted data to a prescribed generation second snapshot volume of the respective second snapshot volumes, and manages an update location in the second volume, and the storage system further comprising a migration controller, which is for migrating data and a snapshot-related configuration from the first storage controller to the second storage controller, and which (1) restores the storage contents of an oldest generation first snapshot volume of the respective first snapshot volumes to the inside of the second volume; and (2) in order from the oldest generation to the newest generation, (2-1) detects difference data between the contents of a first snapshot volume of a migration-targeted generation and the contents of the first snapshot volume that is one generation newer than the first snapshot volume of the migration-targeted generation, and (2-2) transfers this detected difference data to the second storage controller and writes this difference data to the second volume.

In a second aspect according to the first aspect, the migration controller (0) creates in advance the second volume and the second snapshot volumes of the respective generations inside the second storage controller by issuing a prescribed indication to the second storage controller, prior to executing (1).

In a third aspect according to the second aspect, the migration controller respectively configures the relationships between the second volume and the second snapshot volumes of the respective generations to a pair status for suspending difference management in the (0), and changes the relationship between the second volume and the second snapshot volume corresponding to the migration-targeted generation to a suspend status for executing the difference management prior to the execution of the (2-2).

In a fourth aspect according to any of the first through the third aspects, (3) when an update request is issued from the host computer while difference data related to the first snapshot volume of the newest generation is being migrated to the second snapshot volume corresponding to the newest generation, the migration controller manages new difference data which is generated in accordance with this update request, and writes this managed new difference data to the second snapshot volume corresponding to the newest generation.

In a fifth aspect according to the fourth aspect, in the (3), when the host computer requests an update for the difference data being migrated from the first snapshot volume of the newest generation to the second snapshot volume corresponding to the newest generation, the migration controller returns a busy response to the host computer, and when the host computer requests an update for difference data other than the difference data being migrated, the migration controller manages the difference data related to the update request for the difference data other than the difference data being migrated as new difference data.

In a sixth aspect according to the fifth aspect, the migration controller can utilize a management table for managing the difference data being migrated, and can utilize a separate management table for managing the new difference data.

In a seventh aspect according to any of the first through the sixth aspects, the migration controller is disposed in either one of the first storage controller of the second storage controller.

In an eighth aspect, the first storage controller and the second storage controller respectively comprise a plurality of storage devices which are non-replaceably fixed inside an enclosure.

A snapshot configuration migration method according to a ninth aspect of the present invention is a migration method for migrating data and a snapshot-related configuration from a first storage controller to a second storage controller, and the first storage controller and the second storage controller respectively comprise a snapshot function for storing the storage contents of a volume at a specified point in time as an image in a snapshot volume, and the snapshot configuration migration method comprises: a preparation step of creating, inside the second storage controller, a second volume corresponding to a first volume inside the first storage controller, and second snapshot volumes corresponding to first snapshot volumes of respective generations of the first storage controller; an oldest generation restoration step of restoring storage contents of an oldest generation to the second volume by copying data from the first storage controller to the second storage controller based on the contents of the first volume and the contents of a prescribed first snapshot volume of the first snapshot volumes of the respective generations; a difference data detection step of detecting difference data between the contents of a first snapshot volume of a migration-targeted generation and the contents of the first snapshot volume that is one generation newer than the first snapshot volume of the migration-targeted generation; a copying step of writing the detected difference data to the second volume by transferring this detected difference data from the first storage controller to the second storage controller; and a step of repeating the difference data detection step and the copying step while tracing the migration-targeted generation from the oldest generation to a newest generation.

A tenth aspect according to the ninth aspect further comprises a step of managing an update request issued by a host computer during migration, detecting new difference data related to this update request, and writing this new difference data to the second snapshot volume corresponding to the newest generation, when the migration-targeted generation reaches the newest generation.

A snapshot configuration migration method according to an eleventh aspect of the present invention is a migration method for migrating data and a snapshot-related configuration from a first storage controller to a second storage controller, and the first storage controller and the second storage controller respectively comprise a snapshot function for storing the storage contents of a volume at a specified point in time as an image in a snapshot volume, and the snapshot configuration migration method comprises: a preparation step of creating, inside the second storage controller, a second volume corresponding to a first volume inside the first storage controller, and second snapshot volumes corresponding to first snapshot volumes of respective generations of the first storage controller, and of respectively configuring the relationships between the second volume and the respective second snapshot volumes to a pair status for suspending difference management; an oldest generation restoration step of restoring storage contents of an oldest generation to the second volume by copying data from the first storage controller to the second storage controller based on the contents of the first volume and the contents of a prescribed first snapshot volume of the first snapshot volumes of the respective generations; a status change step of changing the relationship between the second volume and the second snapshot volume of the migration-targeted generation to a suspend status for executing difference management; a difference data detection step of detecting difference data between the contents of a first snapshot volume of the migration-targeted generation and the contents of the first snapshot volume that is one generation newer than the first snapshot volume of the migration-targeted generation; a detection data transfer step of transferring the detected difference data from the first storage controller to the second storage controller; a saving step of copying and saving old data updated by the difference data to the second snapshot volume corresponding to the migration-targeted generation by using the snapshot function of the second storage controller, prior to writing the difference data to the second volume corresponding to the migration-targeted generation; a copying step of writing the difference data to the second volume; and a step of repeating the status change step, the difference data detection step, the difference data transfer step, the saving step, and the copying step while tracing the migration-targeted generation from the oldest generation to a newest generation.

At least a portion of the means and steps of the present invention can be configured as a computer program. This computer program can be distributed via a storage medium or a communication medium.

BRIEF DESCRIPTION OF THE DRAWINGS

FIG. 15 is a flowchart showing the details of S20 of FIG. 8.

DETAILED DESCRIPTION OF THE PREFERRED EMBODIMENT

Figure 1:
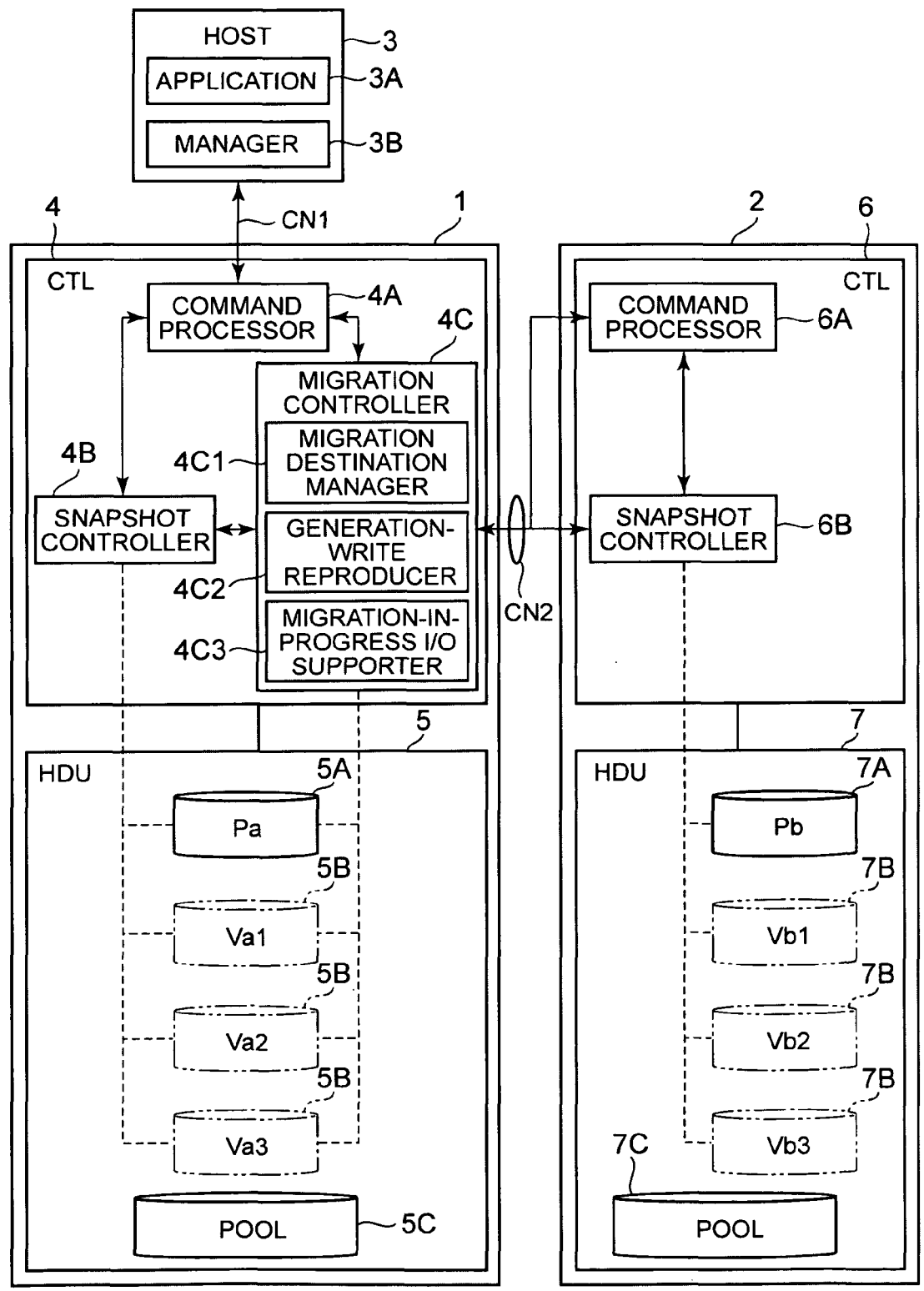
FIG. 1 is a schematic diagram showing the overall configuration of an embodiment of the present invention.

Embodiments of the present invention will be explained hereinbelow on the basis of the figures. In this embodiment, as will be described hereinbelow, an update request related to a snapshot generated in a migration-source first storage controller 1 is reproduced for a migration-destination second storage controller 2 as if the first storage controller 1 is a host computer. Consequently, the second storage controller creates the snapshot configuration using the snapshot function of the second storage controller. Furthermore, the configuration shown in FIG. 1 and the following explanation present an overview of the present invention that will aid in understanding and implementing the present invention, and the scope of the present invention is not limited to the configuration shown in FIG. 1.

The storage system, for example, comprises a first storage controller 1; a second storage controller 2; and at least one host 3. The first storage controller 1 and the host 3 are communicably interconnected via a communication network CN1 for host I/O (input/output) use. The first storage controller 1 and the host 3, for example, carry out two-way communications using a communication protocol, such as iSCSI (internet Small Computer System Interface) or FCP (Fibre Channel Protocol). The first storage controller 1 and the second storage controller 2 are communicably interconnected via a communication network CN2 for migration use. The first storage controller 1 and the second storage controller 2, for example, carry out two-way communications using a communication protocol like FCP.

The host 3, for example, is configured as a computer device, such as a server computer, mainframe computer, personal computer, or handheld terminal (to include a mobile telephone). The host 3 comprises an application program 3A, which uses data stored in the storage controller. Furthermore, the host 3 can also comprise a manager 3B for indicating a migration from the first storage controller 1 to the second storage controller 2.

The first storage controller 1 is the migration-source storage controller. The first storage controller 1, for example, comprises a controller 4, and a storage device mounting unit 5. The controller 4 is for controlling the operation of the first storage controller 1, and, for example, comprises a microprocessor, a memory, and a data transfer circuit.

The controller 4, for example, comprises a command processor 4A; a snapshot controller 4B; and a migration controller 4C. The command processor 4A processes a read command or a write command issued from the host 3, and sends the results of this processing to the host 3.

The snapshot controller 4B manages the data image of a first volume 5A at the point in time of snapshot acquisition. Subsequent to snapshot acquisition, a host 3-updated location and pre-update data are stored in a pool 5C. Respective first snapshot volumes 5B logically store the storage contents of the first volume 5A for each generation acquired by the snapshots.

The snapshot controller 4B manages only the update location and updated contents of the first volume 5A. Therefore, the snapshot controller 4B can provide the host 3 with data of a specified point in time by consuming less storage capacity than when creating a copy of an entire volume. Since only a small amount of storage capacity is used, the host 3 can create snapshots either regularly or irregularly, and consequently can easily restore data that has been lost due to an operational mistake by the user.

The migration controller 4C migrates data and a snapshot configuration from the first storage controller 1 to the second storage controller 2. Snapshot configuration signifies a configuration related to the respective snapshots that have been acquired. The migration controller 4C, for example, comprises a function 4C1 for managing the migration-destination second storage controller 2; a function 4C2 for reproducing write requests of respective generations; and a function 4C3 for dealing with an I/O request from the host 3 issued while a migration is in progress.

The function 4C1, for example, respectively creates a second volume 7A and respective second snapshot volumes 7B inside the second storage controller 2. Further, the function 4C1 controls the relationships between the second volume 7A and the respective second snapshot volumes 7B.

The function 4C2 reproduces respective generations of update requests, which are managed by first snapshot volumes 5B of respective generations, while tracing these update requests from the oldest generation to the newest generation, and issues a write command to the second storage controller 2. That is, the first storage controller 1 acts like a host computer 3 for the second storage controller 2, and issues a write command to the second storage controller 2. In accordance with the write command issued from the first storage controller 1, a snapshot controller 6B inside the second storage controller 2 creates respective generations of second snapshot volumes 7B in order.

The storage device mounting unit 5 comprises a plurality of storage devices. For example, a rewritable nonvolatile storage device, such as a hard disk device or a flash memory device, is utilized as the storage device. The first volume 5A and a pool 5C are created by using the physical storage areas of the respective storage devices. The pool 5C provides a storage area to the respective first snapshot volumes 5B, and snapshot management information is stored in this storage area.

The second storage controller 2 is the migration-destination storage controller. The second storage controller 2 comprises a controller 6 and a storage device mounting unit 7 the same as the first storage controller 1. The controller 6 controls the operation of the second storage controller 2. The storage device mounting unit 7 comprises a plurality of storage devices, and the storage area of a storage device is managed by a pool 7C. The pool 7C respectively provides storage areas to a second volume 7A and respective second snapshot volumes 7B.

A command processor 6A processes a command issued from the first storage controller 1 while a migration is in progress, and sends the result of this processing to the first storage controller 1. That is, the command processor 6A writes the write-data sent from the first storage controller 1 to the second volume 7A, and reports to the first storage controller 1 to the effect that the write has bee completed. When the migration from the first storage controller 1 to the second storage controller 2 is complete, and the host 3 becomes able to access the second storage controller 2, the command processor 6A processes the command issued from the host 3.

A snapshot controller 6B, using the second snapshot volumes 7B, manages the data image of the second volume 7A at the point in time of snapshot acquisition the same as the snapshot controller 4B inside the first storage controller 1. The location updated by the first storage controller 1 and pre-update data are stored in the pool 7C. The respective second snapshot volumes 7B logically store the storage contents of the second volume 7A for each generation acquired by the snapshots.

The first storage controller 1 and the second storage controller 2, for example, can be configured as compact storage controllers in which a plurality of storage devices are non-replaceably fixed inside an enclosure. For example, the respective storage controllers 1, 2 can be created by fixing a control board and a plurality of storage devices inside a relatively small enclosure so as to be incapable of being replaced by the user. A mounting unit for detachably mounting a replaceable storage device in this enclosure can also be provided.

The operation of this embodiment will be explained. The first storage controller 1 is the storage controller already disposed in the storage system, and is utilized by the host 3. For example, when the first storage controller 1 becomes obsolete, or when the first storage controller 1 is in need of repair, the user adds the second storage controller 2 to the storage system. The user connects the first storage controller 1 and the second storage controller 2 to the storage system via the communication network CN2. Then, as will be described hereinbelow, data and a snapshot configuration are migrated from the first storage controller 1 to the second storage controller 2.

The migration controller 4C respectively creates the second volume 7A, the respective second snapshot volumes 7B and the pool 7C inside the second storage controller 2 the same as in the first storage controller 1 by issuing an indication to the controller 6 of the second storage controller 2. That is, the second volume 7A corresponds to the first volume 5A, the respective second snapshot volumes 7B correspond to the respective first snapshot volumes 5B, and the pool 7C corresponds to the pool 5C.

The migration controller 4C configures the pair status between the second volume 7A and the respective second snapshot volumes 7B. Pair status describes a state in which the storage contents of the volumes configuring a pair are the same. Therefore, when the second volume 7A and the respective second snapshot volumes 7B are configured into the pair status, difference management is suspended. The contents of a second snapshot volume 7B will not change even when the second volume 7A is updated. Furthermore, the second snapshot volume 7B here is the storage area in which difference information is stored.

The migration controller 4C, based on the storage contents of the first volume 5A and the data image managed by a prescribed first snapshot volume 5B, reproduces inside the second volume 7A the storage contents of the oldest generation (Va3). That is, the migration controller 4C transfers the oldest generation data of the first volume 5A to the second storage controller 2, and writes this data to the second volume 7A. Consequently, the second volume 7A holds the storage contents of the time at which a snapshot was initially acquired for the first volume 5A.

The migration controller 4C changes the relationship between the second volume 7A and the oldest generation second snapshot volume 7B(Vb3) to the suspend status. Suspend status is the state in which the pair status is suspended, and difference management is executed.

When the suspend status is configured, the update location in the second volume 7A and the old data to be updated are stored in the pool 7C. That is, the update history of the second volume 7A is managed by the second snapshot volume 7B.

The migration controller 4C detects the difference data between the oldest generation (Va3) and the generation that is one generation newer (Va2), transfers this detected difference data to the second storage controller 2, and copies this data to the second volume 7A.

Since the second volume 7A and the oldest generation second snapshot volume 7B(Vb3) have been configured to the suspend status, when the difference data is written to the second volume 7A, the old data prior to updating by the difference data is saved to the oldest generation second snapshot volume 7B(Vb3). In other words, the state at the time at which the oldest generation first snapshot volume 5B(Va3) was created inside the first storage controller 1 is reproduced inside the second storage controller 2, and the oldest generation second snapshot volume 7B(Vb3) is created.

Similarly, the migration controller 4C changes the relationship between the second volume 7A and the second snapshot volume 7B(Vb2) of generation (Vb2) to the suspend status, and detects the difference data between generation (Va2) and the generation that is one generation newer (Va1), and copies this difference data to the second volume 7A. Prior to the difference data being written to the second volume 7A, the old data is saved to the second snapshot volume 7B(Vb2). The state at the time at which the first snapshot volume 5B(Va2) was created inside the first storage controller 1 is reproduced inside the second storage controller 2, and the second snapshot volume 7B(Vb2) is created.

Thus, the migration controller 4C copies the difference data generated by the respective generations to the second volume 7A by tracing in order from the oldest generation to the newest generation. Consequently, the respective generations of second snapshot volumes 7B are created inside the second storage controller 2 by the snapshot controller 6B.

In other words, this embodiment uses the snapshot function of the second storage controller 2 to automatically create the respective generations of second snapshot volumes 7B by tracing the update history of the first volume 5A generated by the first storage controller 1.

Now then, when the migration of the newest generation (Va1) snapshot volume commences, the migration controller 4C responds to an I/O request issued by the host 3 during the migration. For example, when the host 3 issues an update request (write command) related to difference data while migration is in progress, the migration controller 4C returns a busy response to the host 3. When the host 3 issues an update request related to data other than update date while migration is in progress, the migration controller 4C manages the location of the new difference data (for example, the block address) generated by this update request. Then, the migration controller 4C copies the new difference data to the second volume 7A. Consequently, the contents of the newest generation second snapshot volume 7B(Vb1) also changes.

That is, in this embodiment, the snapshot function is operated simultaneously in both the migration-source first storage controller 1 and the migration-destination second storage controller 2. Snapshot management is managed by the first storage controller 1.

Configuring this embodiment like this makes it possible to automatically create in the second storage controller 2 the snapshot configuration inside the first storage controller 1, using the snapshot controller 6B of the migration-destination second storage controller 2.

Therefore, for example, it is possible to migrate volume data and a snapshot configuration from the first storage controller 1 to the second storage controller 2 without utilizing a special program for copying the snapshot management information from pool 5C to pool 7C, or mapping the snapshot management information copied to pool 7C to the second volume 7A. Since data and a snapshot configuration can be migrated relatively cheaply and easily in accordance with this embodiment, user ease-of-use is also enhanced.

In this embodiment, it is possible to migrate data and a snapshot configuration from the first storage controller 1 to the second storage controller 2 without suspending host 3 access to the first storage controller 1. Therefore, a migration operation can be carried out without the awareness of the user, thereby enhancing usability. In this mode, since a deviation occurs in the time stamp (date/time of a snapshot) and other such attribute information between the old and the new storage systems, a mechanism for separately migrating this information subsequent to the end of the data and configuration information migration is provided. There are two methods for carrying out this separate migration: a method for rewriting the relevant information in the new storage system, and a method for separately managing this information using a mapping table without altering the original information.

In this embodiment, a migration process can be carried out by the first storage controller 1 and the second storage controller 2 without going through the host 3. Therefore, data and a snapshot configuration can be moved from the first storage controller 1 to the second storage controller 2 without placing a burden on the host 3, thereby enhancing the ease-of-use of the user. This embodiment will be explained in detail hereinbelow.

First Embodiment

Figure 2:
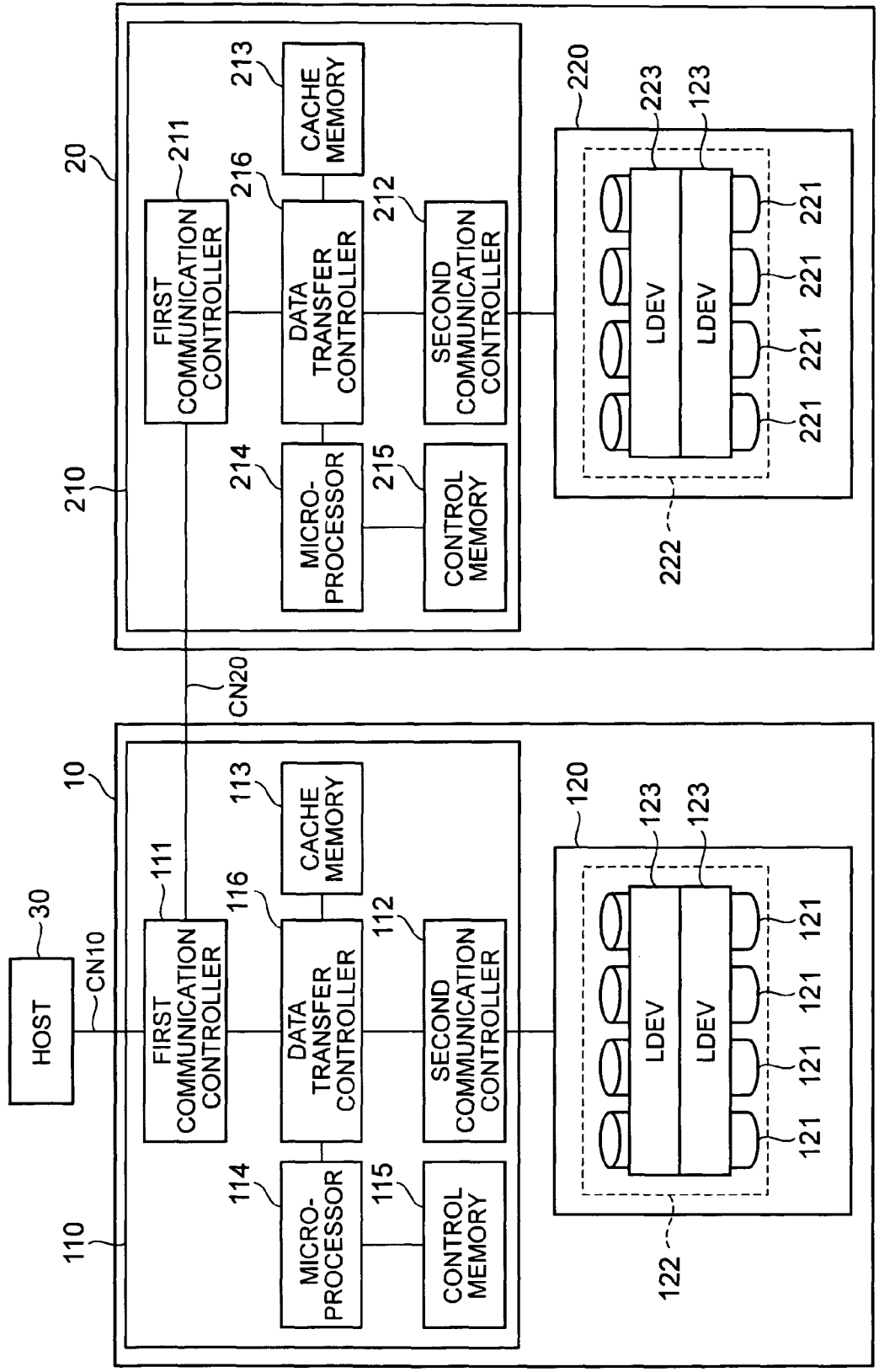
FIG. 2 is a block diagram showing the overall configuration of a snapshot volume related to the embodiment.

FIG. 2 is a block diagram showing the overall configuration of a storage system according to this embodiment. This storage system comprises a first storage controller 10; a second storage controller 20; and a host 30.

The corresponding relationship with FIG. 1 will be explained. The first storage controller 10 corresponds to the first storage controller 1 of FIG. 1, the second storage controller 20 corresponds to the second storage controller 2 of FIG. 1, the host 30 corresponds to the host 3 of FIG. 1, a first controller 110 corresponds to the first controller 4 of FIG. 1, a second controller 210 corresponds to the second controller 6 of FIG. 1, a first storage device mounting unit 120 corresponds to the first storage device mounting unit 5 of FIG. 1, a second storage device mounting unit 220 corresponds to the second storage device mounting unit 7 of FIG. 1, a communication network CN10 corresponds to the communication network CN1 of FIG. 1, and a communication network CN20 corresponds to the CN2 of FIG. 1.

Figure 3:
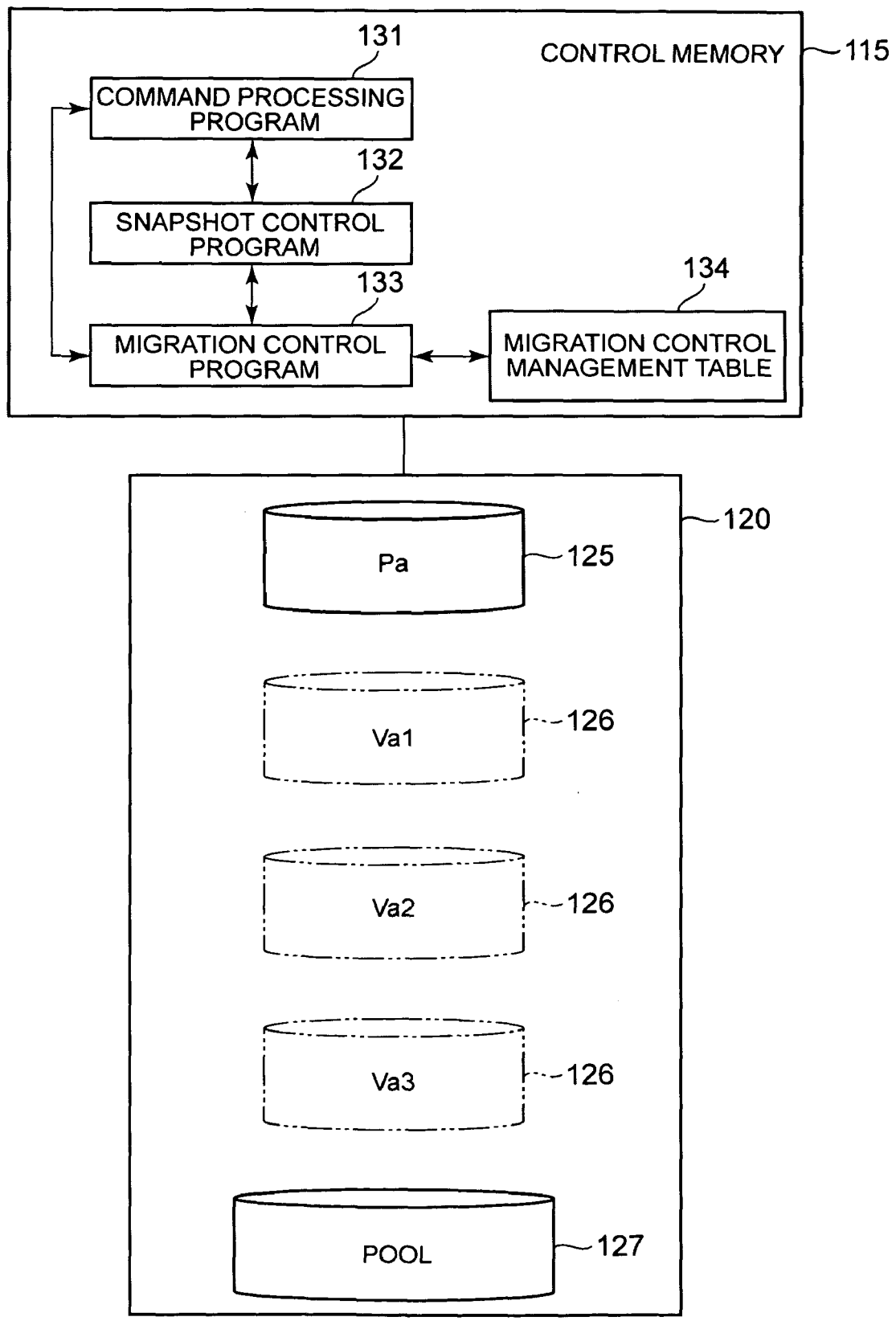
FIG. 3 is a schematic diagram showing the program configuration and volume configuration of a first storage controller.

The command processing program 131 shown in FIG. 3 corresponds to the command processor 4A of FIG. 1, the snapshot control program 132 shown in FIG. 3 corresponds to the snapshot controller 4B of FIG. 1, and the migration control program 133 shown in FIG. 3 corresponds to the migration controller 4C of FIG. 1. The first volume 125 shown in FIG. 3 corresponds to the first volume 5A of FIG. 1, the first snapshot volume 126 shown in FIG. 3 corresponds to the first snapshot volume 5B of FIG. 1, and the first pool 127 shown in FIG. 3 corresponds to the first pool 5C of FIG. 1.

Figure 5:
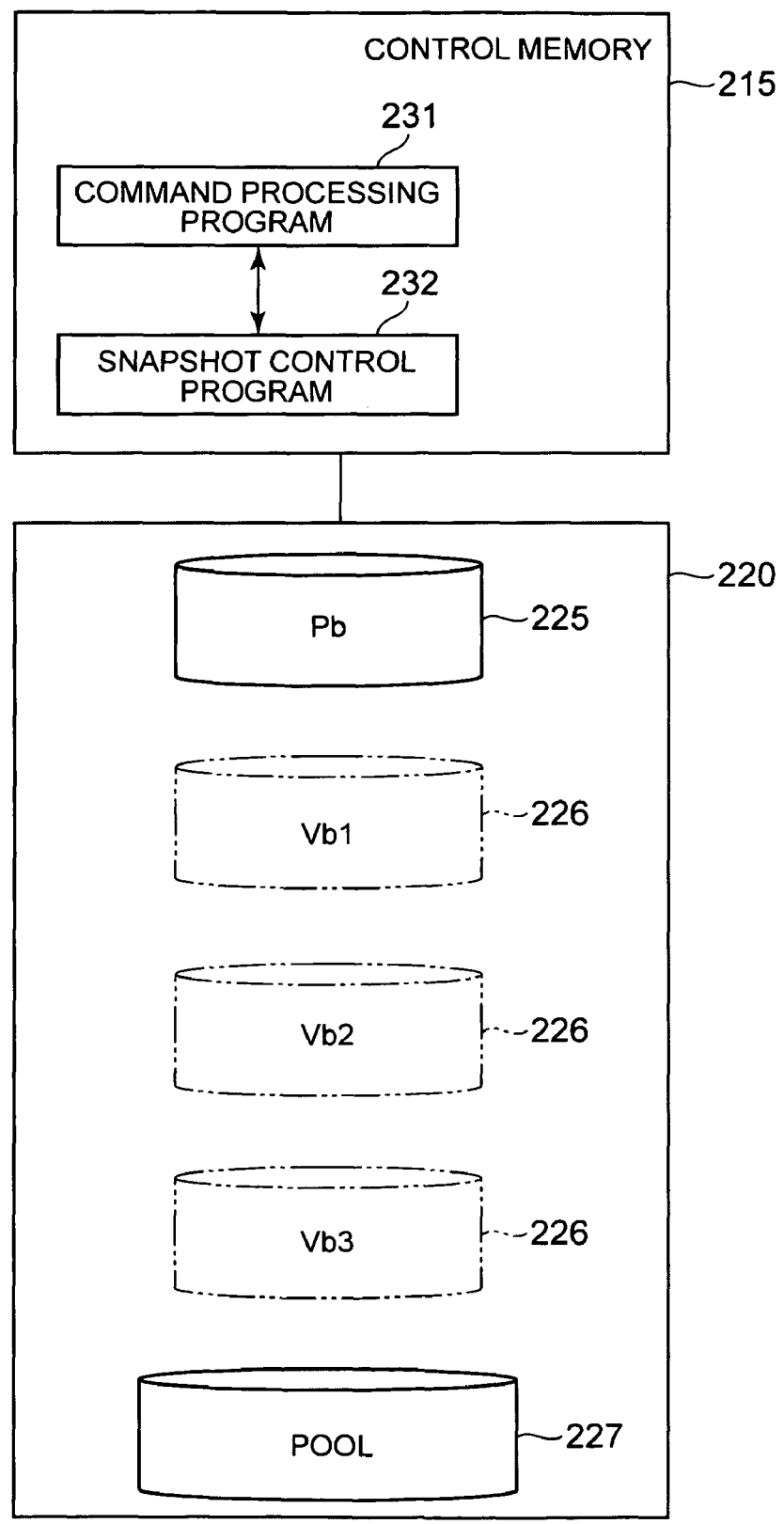
FIG. 5 is a schematic diagram showing the program configuration and volume configuration of a second storage controller.

The command processing program 231 shown in FIG. 5 corresponds to the command processor 6A of FIG. 1, the snapshot control program 232 shown in FIG. 5 corresponds to the snapshot controller 6B of FIG. 1, the second volume 225 shown in FIG. 5 corresponds to the second volume 7A of FIG. 1, the second snapshot volume 226 shown in FIG. 5 corresponds to the second snapshot volume 7B of FIG. 1, and the second pool 227 shown in FIG. 5 corresponds to the second pool 7C of FIG. 1.

Return to FIG. 2. Similarly to the host 3 described using FIG. 1, the host 30 is configured as a computer device, such as a server computer, a mainframe computer, or a personal computer, and is connected to the first storage controller 10 via the communication network CN10.

The first storage controller 10 can be broadly divided into a controller 110, and a storage device mounting unit 120. The controller 110 is for controlling the operation of the first storage controller 10. The controller 110, for example, comprises a first communication controller 111; a second communication controller 112; a cache memory 113; a microprocessor 114; a control memory 115; and a data transfer controller 116.

The first communication controller 111 is a communication control circuit for carrying out communications with the host 30 and the second storage controller 20. The first communication controller 111, for example, communicates with the host 30 and the second storage controller 20 using iSCSI or FCP.

The second communication controller 112 is a communication control circuit for carrying out communications with the respective storage devices 121. The second communication controller 112, for example, communicates with the respective storage devices 121 using FCP. Furthermore, the second communication controllers 112, 212 can also be configured so as to connect expanders, and carry out communications with the first storage controller 10 and the second storage controller 20 via the expanders.

The cache memory 113 is for storing data received from the host 30 and data read out from a storage device 121. The control memory 115 is for storing various programs and control information, which will be explained hereinbelow.

The microprocessor 114 respectively realizes a command processing function, a snapshot control function, and a migration control function by reading in and executing a computer program stored in the control memory 115.

The data transfer controller 116, for example, is configured as a DMA (Direct Memory Access) circuit. The respective communication controllers 111, 112 can directly access the cache memory 113 without going through the microprocessor 114 by using the data transfer controller 116.

The storage device mounting unit 120 comprises a plurality of storage device 121. For example, various devices capable of reading and writing data, such as a hard disk device, semiconductor memory device, optical disk device, magneto-optical disk device, magnetic tape device, and flexible disk device can be used as a storage device 121.

When a hard disk device is used as the storage device, for example, a FC (Fibre Channel) disk, SCSI (Small Computer System Interface) disk, SATA disk, ATA (AT Attachment) disk, SAS (Serial Attached SCSI) disk and the like can be used. When a semiconductor memory device is used as the storage device, for example, a variety of memory devices, such as a flash memory, FeRAM (Ferroelectric Random Access Memory), MRAM (Magnetoresistive Random Access Memory), Ovonic Unified Memory, or RRAM (Resistance RAM), can be used.

Furthermore, the storage device type is not limited to the types mentioned above, and other types of storage device commercialized in the future could also be used.

The physical storage area of either one or a plurality of storage devices 121 can be virtualized as a single group 122. Either one or a plurality of logical devices (LDEV) 123 can be disposed in this virtualized physical storage area 122.

A logical volume is created by configuring a LUN (Logical Unit Number) for a logical device 123. The host 30 can access and use the logical volume by configuring an access channel between the host 30 and the logical volume.

The second storage controller 20 can be broadly divided into a controller 210 and a storage device mounting unit 220 the same as the first storage controller 10. The controller 210 comprises a first communication controller 211; a second communication controller 212; a cache memory 213; a microprocessor 214; a control memory 215; and a data transfer controller 216. Since the controller 210 can be configured the same as the controller 110 of the first storage controller 10, a detailed explanation will be omitted.

The storage device mounting unit 220 comprises a plurality of storage devices 221. Either one or a plurality of logical devices 223 are provided in a group 222. Since the storage device mounting unit 220 can be configured the same as the storage device mounting unit 120 of the first storage controller 10, a detailed explanation will be omitted.

FIG. 3 is a diagram schematically showing the computer programs stored in the control memory 115 of the first storage controller 10, and a storage configuration. As shown at the top of FIG. 3, the control memory 115, for example, stores a command processing program 131; a snapshot control program 132; a migration control program 133; and a migration control management table 134.

The command processing program 131 is for processing a read command or a write command issued from the host 30, and for sending the result of this processing to the host 30.

The snapshot control program 132 is for acquiring a snapshot at a point in time specified by the host 30 for a host 30-specified volume.

The migration control program 133 is for using the snapshot control function of the second storage controller 20 to dispose the data and snapshot configuration of the first storage controller 10 inside the second storage controller 20 by converting the update history of the first storage controller 10 to a write command for the second storage controller 20. The migration control management table 134 is for managing the migration of the data and snapshot configuration.

As shown at the bottom of FIG. 3, the first volume 125, which is used by the host 30, is disposed inside the first storage controller 10. The first storage controller 10 comprises a pool 127 for managing the storage area as a pool.

The storage area managed by the pool 127 is used to create the respective generations (Va1 through Va3) of first snapshot volumes 126. The respective first snapshot volumes 126 logically hold the storage contents of the first volume 125 at the points in time when the respective snapshots were acquired.

The more the host 30 updates the first volume 125 subsequent to creating a snapshot, the more the snapshot management information to be managed by the snapshot volume 126 increases. If the storage capacity of the snapshot volume 126 is fixed, when this fixed storage capacity is used up, it becomes impossible to manage any more differences. Further, when the storage capacity of the snapshot volume 126 is fixed, unused wasted storage area occurs when the quantity of data updated in the first volume 125 by the host 30 is small. Accordingly, this embodiment efficiently creates a snapshot volume 126 by collectively managing the storage area of the pool 127, and allocating a required amount of storage area to the snapshot volume 126.

Figure 4:
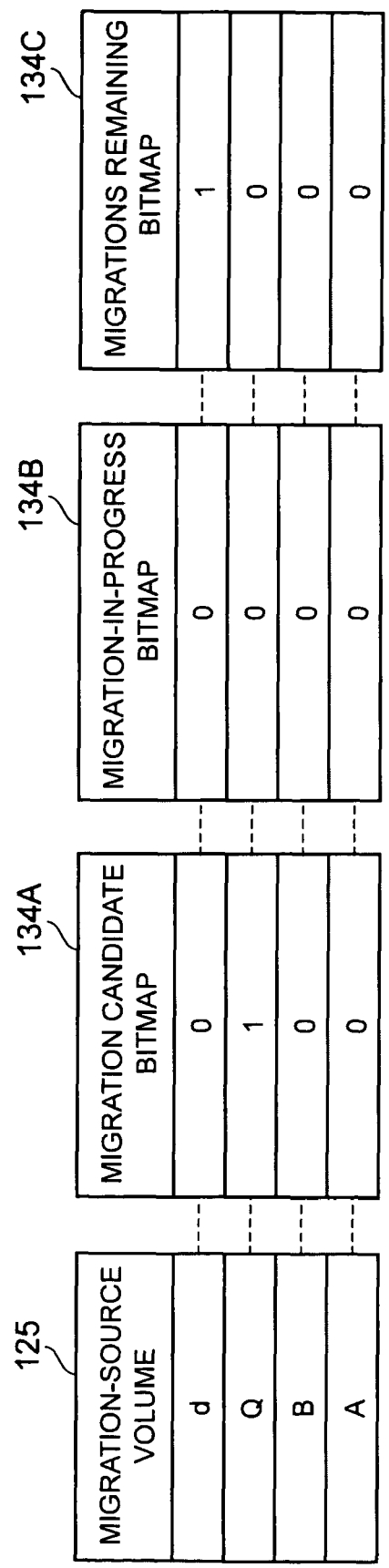
FIG. 4 is a schematic diagram showing a migration control management table.

FIG. 4 is a diagram schematically showing the configuration of the migration control management table 134. The migration control management table 134, for example, can be configured from a plurality of bitmap tables (hereinafter, bitmaps) 134A through 134C.

A migration candidate bitmap 134A is a management table for showing the logical block constituting a migration target. The first volume 125 is configured from a plurality of logical blocks, and the migration candidate bitmap 134A comprises bits corresponding to the respective logical blocks. The value "1" is set in the logical block for migrating data from the first volume 125 to the second volume 225. The value "0" is set in a logical block other than the migration target.

A migration-in-progress bitmap 134B is a management table for showing a logical block that is currently undergoing migration processing. A "1" is set in the logical block for which a migration is being processed. A "0" is set in a logical block which is not undergoing migration processing.

A migrations remaining bitmap 134C is a management table for showing a logical block, which is to be migrated, but which has yet to become the migration target. That is, the migrations remaining bitmap 134C manages a logical block, which has been updated by the host 30 during migration from the first storage controller 10 to the second storage controller 20.

A specific utilization method will be explained. For a logical block in which a difference is generated between the newest generation first snapshot volume 126(Va1) and the first volume 125, a "1" is set in the migration candidate bitmap 134A.

The first controller 110 selects one of the logical blocks for which "1" has been set in the migration candidate bitmap 134A. The first controller 110 sets the bit of the migration-in-progress bitmap 134B to "1" for this selected logical block. At the same time, the first controller 110 resets the bit of the migration candidate bitmap 134A for the selected logical block.

The first controller 110 copies the data of the logical block for which "1" has been set in the migration-in-progress bitmap 134B from the first volume 125 to the second volume 225. Subsequent to the end of the copy, the first controller 110 resets the bit of the migration-in-progress bitmap 134B for the logical block for which copying has ended.

When the host 30 updates the first volume 125 subsequent to the start of the migration of the newest generation, a "1" is set in the bit of the migrations remaining bitmap 134C for the updated logical block.

When all the bits of the migration candidate bitmap 134A are "0", the values of the migrations remaining bitmap 134C are copied to the migration candidate bitmap 134A. The migrations remaining bitmap 134C is reset.

FIG. 5 is a diagram schematically showing the computer programs stored in the control memory 215 of the second storage controller 20, and the storage structure of the second storage controller 20. The control memory 215 stores a command processing program 231; and a snapshot control program 232.

The command processing program 231 is for processing a command issued from the command-issuing device, and returning the result of this processing to the command-issuing device. Command-issuing device here corresponds to the first storage controller 10 and the host 30. The first storage controller 10 becomes the command-issuing device during the period in which data and a snapshot configuration are being migrated from the first storage controller 10 to the second storage controller 20. Subsequent to migration ending, and the first storage controller 10 being rewritten to the second storage controller 20, the host 30 becomes the command-issuing device.

The snapshot control program 232 is for acquiring a snapshot for a specified volume at a specified point in time. In this embodiment, the second volume 225, respective second snapshot volumes 226, and the pool 227 are created inside the second storage controller 20 in accordance with an indication from the first storage controller 10 prior to the data and snapshot configuration being migrated from the first storage controller 10 to the second storage controller 20.

When data is copied from the first volume 125 of the first storage controller 10 to the second volume 225, the snapshot control program 232 saves the update-targeted old data to a prescribed generation second snapshot volume 226.

Figure 6:
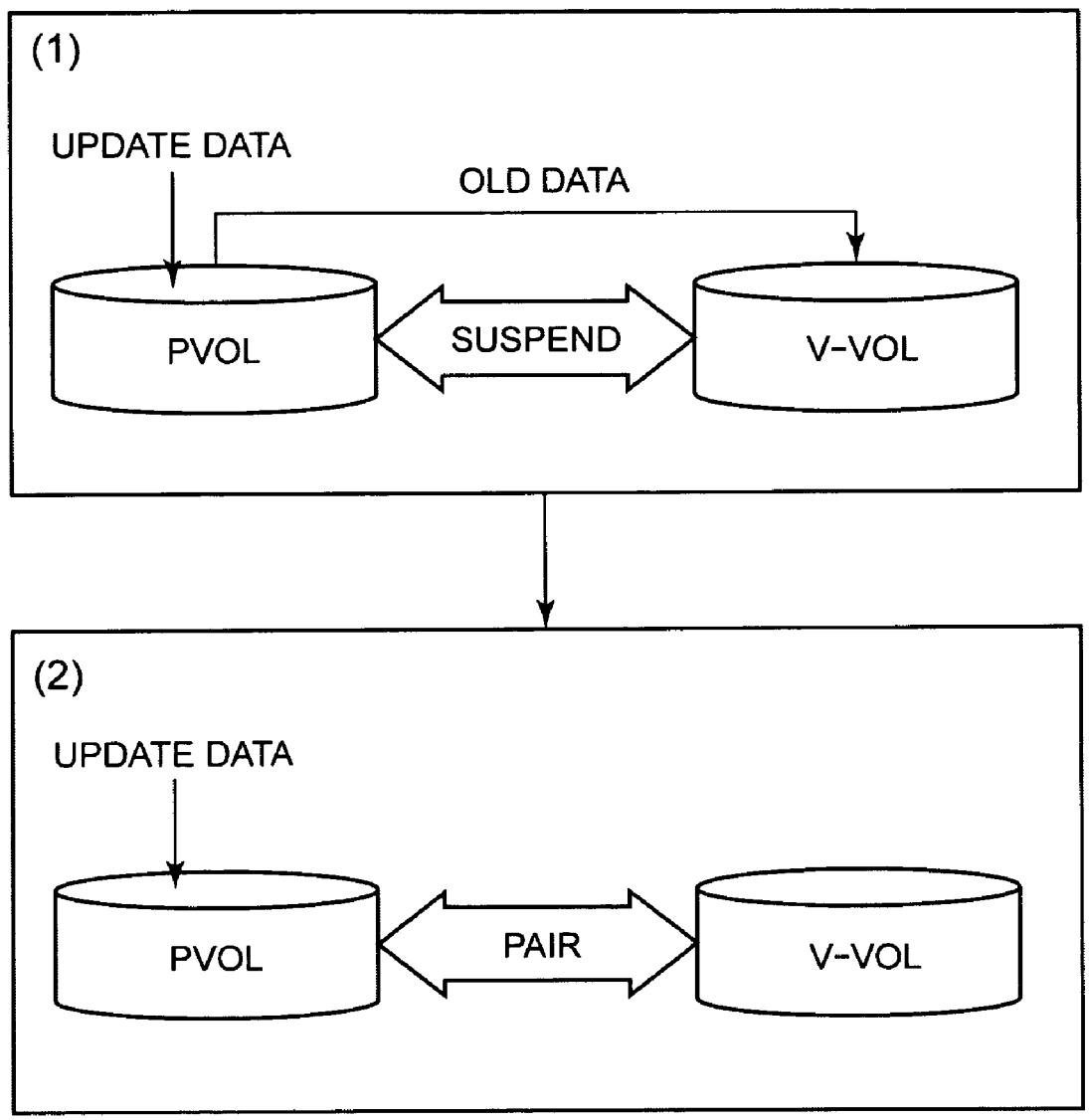
FIG. 6 is a schematic diagram showing the relationship between a main volume and a snapshot volume.

FIG. 6 is a schematic diagram showing the relationship between the main volume and the snapshot volume ("V-VOL" in the figure). The main volume and the snapshot volume are set to either the suspend status or the pair status. In this embodiment, the first volume 125 and the second volume 225 are both main volumes.

FIG. 6(1) shows the suspend status. In the suspend status, a difference that is generated in the main volume is managed by the snapshot volume. When the host 30 updates the main volume, the old data of prior to updating is saved to the snapshot volume. Snapshot management information correspondently manages the old data source location and the old data. Therefore, referencing the snapshot management information makes it possible to logically restore the pre-update status.

FIG. 6(2) shows the pair status. In the pair status, the contents of the main volume and the contents of the snapshot volume are treated as a match, and a difference that is generated in the main volume is not managed. Therefore, even if the host 30 should update the main volume, the pre-update old data is not stored in the snapshot volume.

Figure 7:
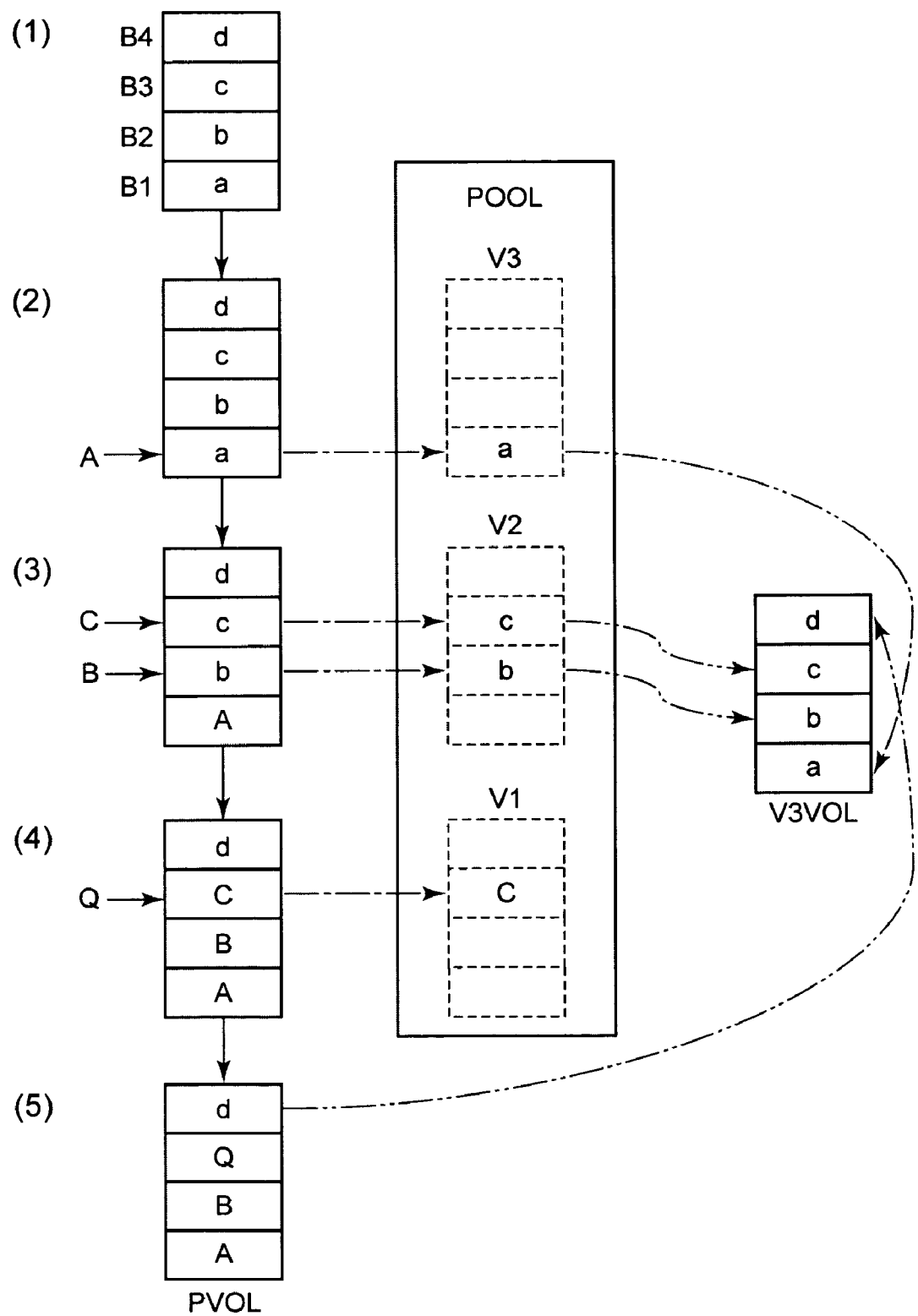
FIG. 7 is a schematic diagram showing how to restore the storage contents of a specified generation using a main volume and respective snapshot volumes.

FIG. 7 is a schematic diagram showing how to restore the storage contents of a specified generation using the snapshot volume. FIG. 7 shows how to restore the storage contents of the main volume in the oldest generation (V3).

FIG. 7(1) shows the main volume storage contents when the oldest generation snapshot was acquired. Data "a" is stored in logical block (hereinafter, block) B1, data "b" is stored in block B2, data "c" is stored in block B3, and data "d" is stored in block B4.

As shown in FIG. 7(2), when the host 30 updates the data of block B1 to "A", the old data "a" is saved to the oldest generation (V3) snapshot volume.

Thereafter, a new snapshot acquisition is requested by the host 30, and the generation switches from the oldest generation (V3) to the subsequent generation (V2). As shown in FIG. 7(3), when the host 30 updates block B2 to new data "B", and updates block B3 to new data "C", the old data "b" and "c" is saved to the subsequent generation snapshot volume.

Thereafter, the host 30 requests yet another snapshot, and the generation switches from the subsequent generation (V2) to the newest generation (V1). As shown in FIG. 7(4), when the host 30 updates block B3 with new data "Q", the old data "C" is saved to the newest generation snapshot volume.

FIG. 7(5) shows the current storage status of the main volume. Blocks B1 through B3 have been updated in the past, and only block B4 has not been updated.

As shown in the right side of FIG. 7, when restoring the storage contents of the main volume in the oldest generation, this embodiment traces through the snapshot volumes in order from the oldest generation to the newest generation, and applies the snapshot management information managed by the respective generations to the storage contents of the main volume. Consequently, the main volume storage contents are logically restored in the oldest generation (V3 VOL in FIG. 7).

That is, the storage contents of a desired generation can be restored by treating the storage contents of the main volume as the basis, and applying the update histories of the respective generations in order.

The storage contents of a specified generation (in this example, the oldest generation) can be materialized by writing the data extracted from the main volume and respective generations of snapshot volumes to a logical volume other than the main volume.

Furthermore, even if the storage contents of the oldest generation are not materialized, since the main volume storage contents are logically restored in the oldest generation, read access is possible. In FIG. 7, a situation, in which the storage contents of the oldest generation are restored and materialized, is described, but the same can also be done for the other generations.

Figure 8:
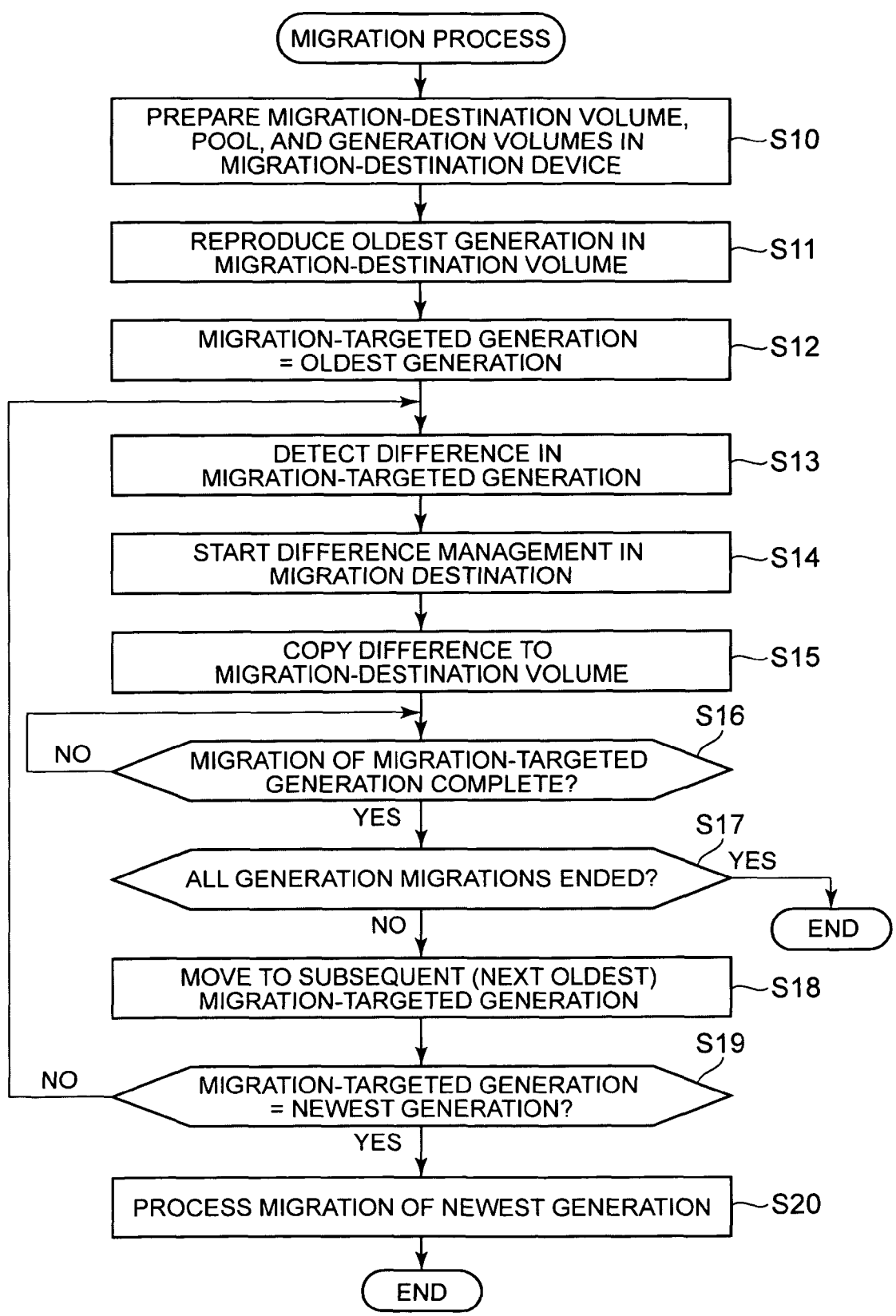
FIG. 8 is a flowchart showing a migration process.

FIG. 8 is a flowchart showing a migration process according to this embodiment. The following flowcharts show overviews of the respective processes to the extent necessary to understand and implement the present invention, and these processes may differ from those of an actual computer program. A so-called person having ordinary skill in the art should be able to change of portion of the steps, rearrange the order of the steps, and delete a step shown in the figure. The following explanation will focus on FIG. 8 while referring as needed to FIGS. 9 through 13.

The migration process is led by the first controller 110 of the first storage controller 10, which is the migration source. The first controller 110 completes migration preparations before starting the migration process (S10). First, the first controller 110 issues an indication to the second controller 210 via the communication network CN20 to make preparations for the migration process (S10).

That is, the first controller 110 specifies the migration-targeted snapshot configuration, and issues an indication to the second controller 210 to prepare a configuration for receiving this specified migration-targeted snapshot configuration inside the second storage controller 20, which is the migration destination.

The migration-targeted snapshot configuration can include the to-be-migrated first volume 125, the respective first snapshot volumes 126, and the pool 127, which provides the storage areas to the respective first snapshot volumes 126. Only a first snapshot volume 126 set in the suspend status is selected as the migration target.

The second controller 210 respectively constructs, inside the second storage controller 20, a second volume 225 corresponding to the first volume 125, respective second snapshot volumes 226 corresponding to the respective first snapshot volumes 126, and a second pool 227 corresponding to the first pool 127 (S10) as the configuration for receiving the migration-targeted snapshot configuration.

Furthermore, prior to the start of the migration process, the first controller 110 allows the host 30 read access and write access only to the first volume 125, and prohibits the host 30 to have write access to the respective first snapshot volumes 126 (S10). The first controller 110 can allow the host 30 to have read access to the respective first snapshot volumes 126.

Access control like this, for example, can be realized by using a table for respectively managing the access attribute of the first volume 125 and the access attribute of the respective first snapshot volumes 126. The access attribute of the first volume 125 is set to "both read and write enabled", and the access attribute of the respective first snapshot volumes 126 is set to "read only".

Furthermore, when read access to the respective first snapshot volumes 126 is prohibited, the access attribute of the respective first snapshot volumes 126 is set to either "both read and write prohibited" or to "hidden". "Hidden" is the attribute for hiding the existence of the first snapshot volume 126 from the host 30.

The first controller 110, upon confirming that preparations are complete on the second storage controller 20 side, materializes the first volume 125 storage contents of the oldest generation in the second volume 225 (S11). Furthermore, materialize signifies writing the storage contents of the first volume 125 to the second volume 225, or reproducing data based on the received contents.

Figure 9:
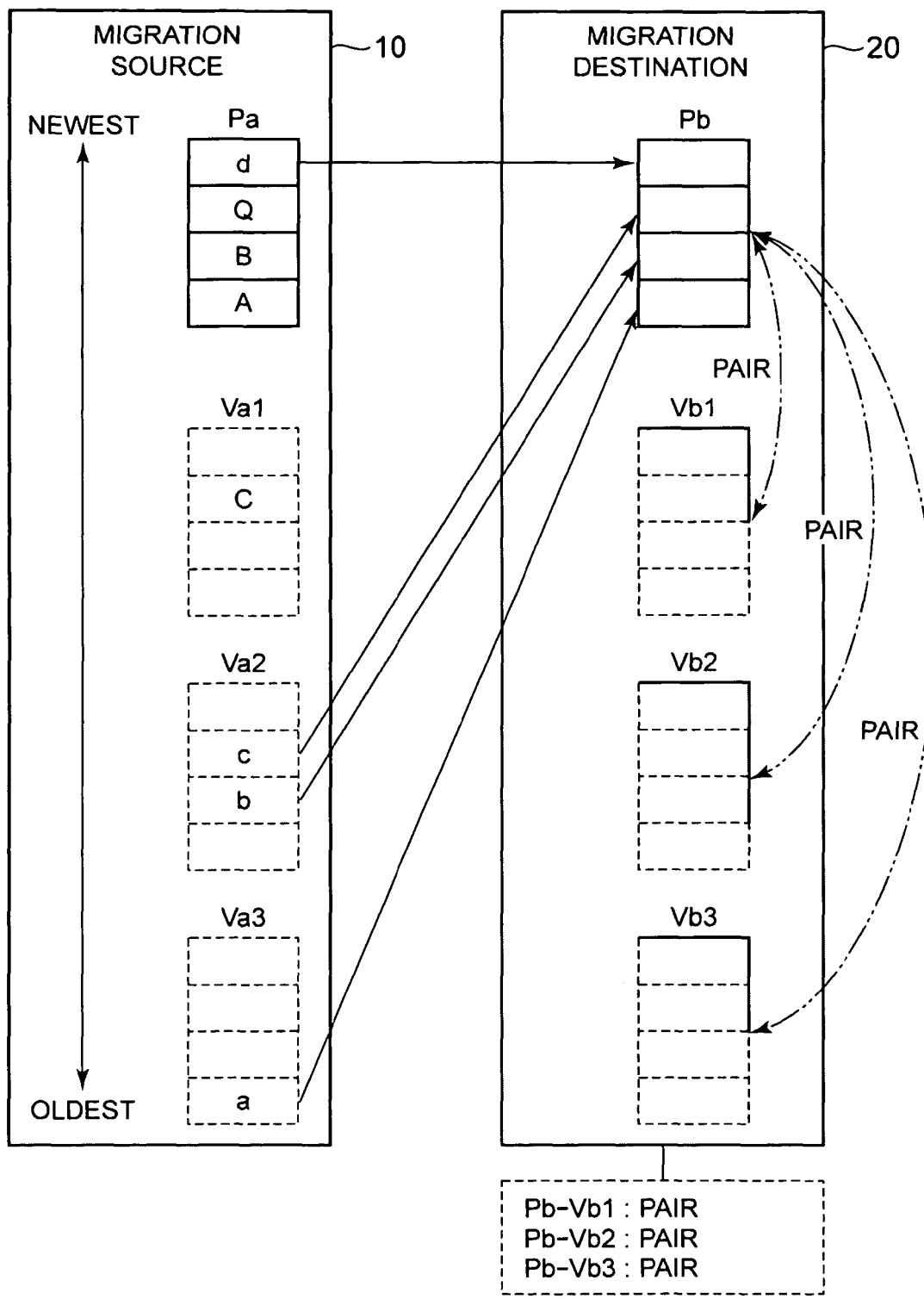
FIG. 9 is a schematic diagram showing how to prepare a configuration for receiving a snapshot configuration in a migration-destination storage controller.

As shown in FIG. 9, the first controller 110 respectively sets the relationships of the second volume 225 and the respective second snapshot volumes 226 to the pair status by issuing an indication to the second controller 210.

Figure 10:
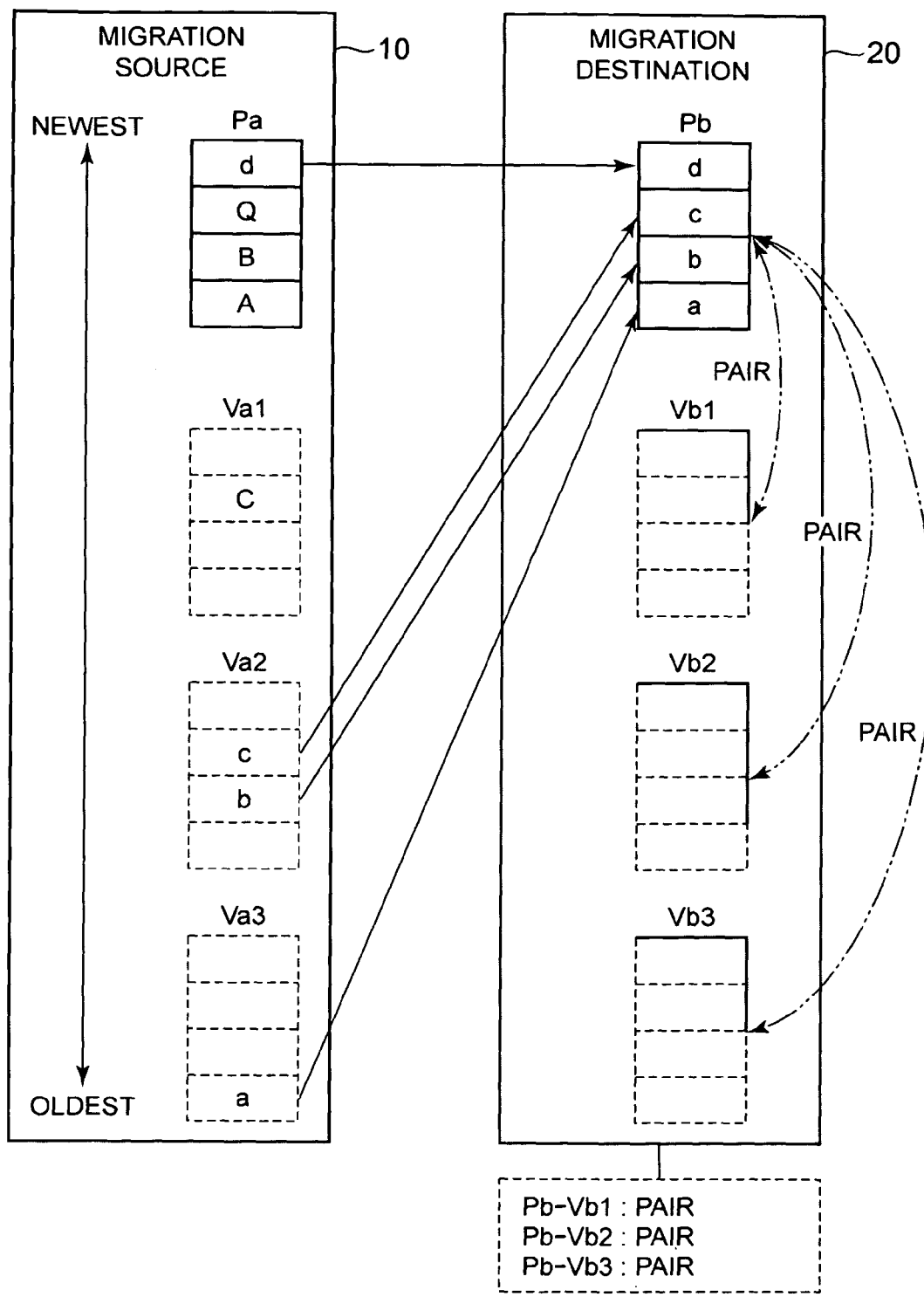
FIG. 10 is a schematic diagram showing how to materialize the storage contents of the oldest generation in a migration-destination volume.

As shown in FIG. 10, the first controller 110 materializes the storage contents of the oldest generation inside the second volume 225 by sending the first volume 125 data in the oldest generation to the second storage controller 20 and writing this data to the second volume 225 (S11).

The second volume 225 and the respective second snapshot volumes 226 are set to the pair status, and difference management is suspended. Therefore, even if the oldest generation data is written to the second volume 225, this has no effect on the respective second snapshot volumes 226.

The first controller 110 sets the oldest generation (V3) as the generation targeted for migration processing (S12). The first controller 110 detects difference data generated in the oldest generation (S13). The first controller 110 changes the second snapshot volume 226(Vb3) corresponding to the oldest generation to the suspend status by issuing an indication to the second controller 210 (S14). Consequently, difference management commences in the second storage controller 20 and the contents of the second snapshot volume 226(Vb3) in accordance with the update to the second volume 225. Furthermore, the order in which S13 and S14 are carried out can be switched.

The first controller 110 sends the difference data detected in S13 to the second storage controller 20, and copies this difference data to the second volume 225 (S15). Since difference management has gotten underway in the second storage controller 20, when the second volume 225 is updated in S15, the old data stored in the second volume 225 is saved to the oldest generation second snapshot volume 226(Vb3).

Figure 11:
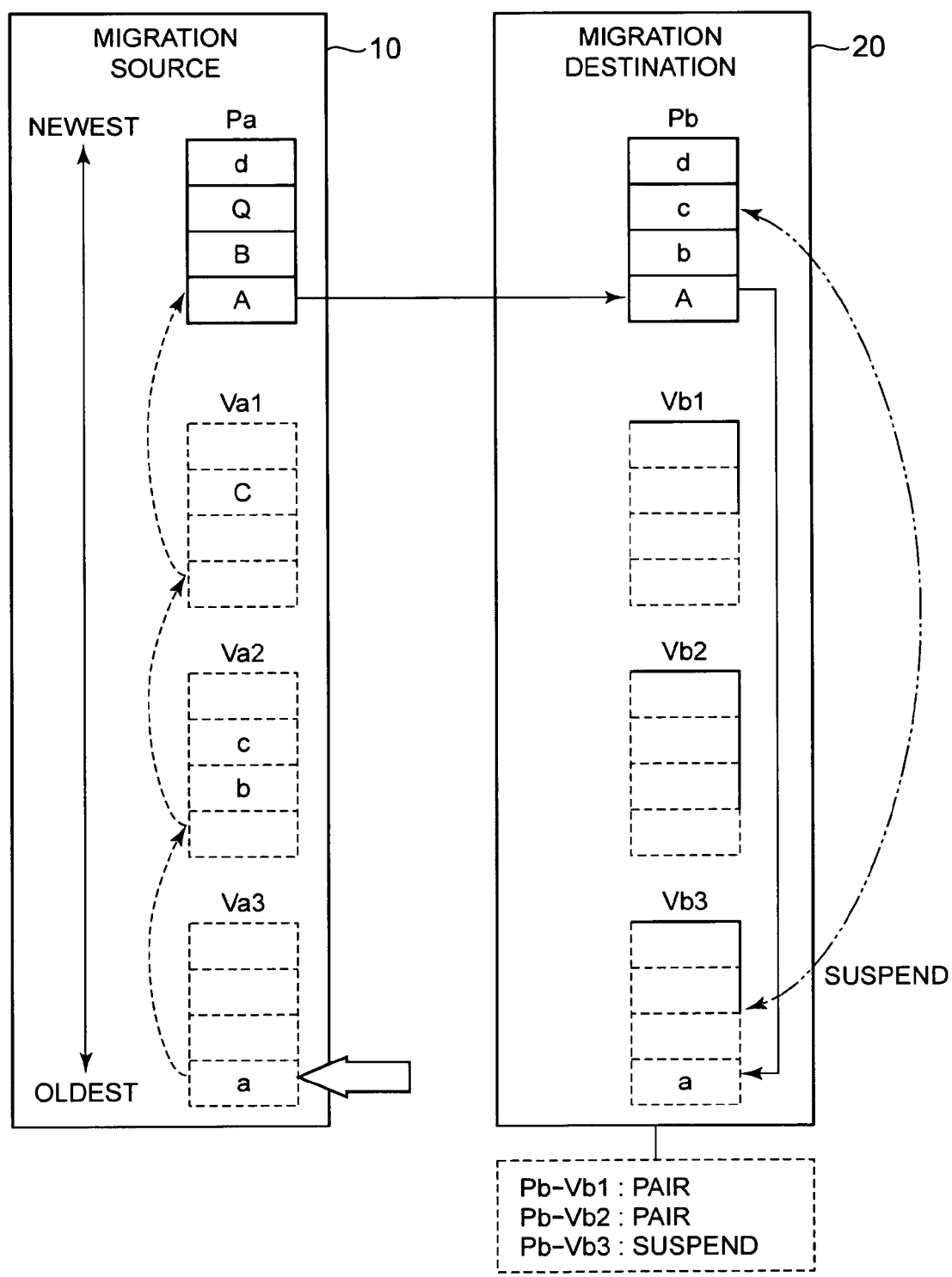
FIG. 11 is a schematic diagram showing how to create an oldest generation snapshot volume using a migration-destination snapshot function by writing the difference data that is generated in the oldest generation to the migration-destination volume.

As shown in FIG. 11, the first controller 110 detects a block in which a difference is generated between the oldest generation first snapshot volume 126(Va3), which is the migration-targeted generation, and the first snapshot volume 126(Va2), which is one generation newer than the oldest generation. The first controller 110 detects data "A" of the first snapshot volume (Va2) corresponding to the block in which this difference is generated as the difference data (S13).

When the first controller 110 copies the difference data "A" to the second volume 225 (S15), the old data "a" stored in the second volume 225 is saved to the second snapshot volume 226(Vb3) corresponding to the oldest generation. This snapshot control is carried out by the second controller 210.

As a result of this, the second snapshot volume 226(Vb3) corresponding to the oldest generation constitutes the same configuration as the oldest generation first snapshot volume 126(Va3). That is, the first controller 110 reproduces the oldest generation updated generated in the first volume 125 as a difference data (update data) write process to the second volume 225 based on the first snapshot volume 126 and the first volume 125 (based on the update history).

When all difference data related to the migration-targeted generation has been copied to the second volume 225, this migration-targeted generation second snapshot volume 226 is complete (S16). When the migration of the migration-targeted generation is complete (S16: YES), the first controller 110 determines whether or not the migration of all generations has been completed (S17). When all generation migrations have been completed, this processing ends.

When there is a generation that has yet to be migrated (S17: NO), the first controller 110 makes the migration-targeted generation the generation that is one generation newer (S18). In this example, the migration-targeted generation is switched from the oldest generation (V3) to the subsequent generation (V2) (S18).

The first controller 110 determines whether or not the migration-targeted generation has reached the newest generation (V1) (S19). When the migration-targeted generation has not reached the newest generation (S19: NO), the first controller 110 returns to S13, and repeats the above-described steps S13 through S18.

When the migration-targeted generation has reached the newest generation (S19: YES), the first controller 110 executes migration processing for the newest generation (S20). The migration processing for the newest generation will be explained hereinbelow by referring to FIGS. 14 and 15.

Figure 12:
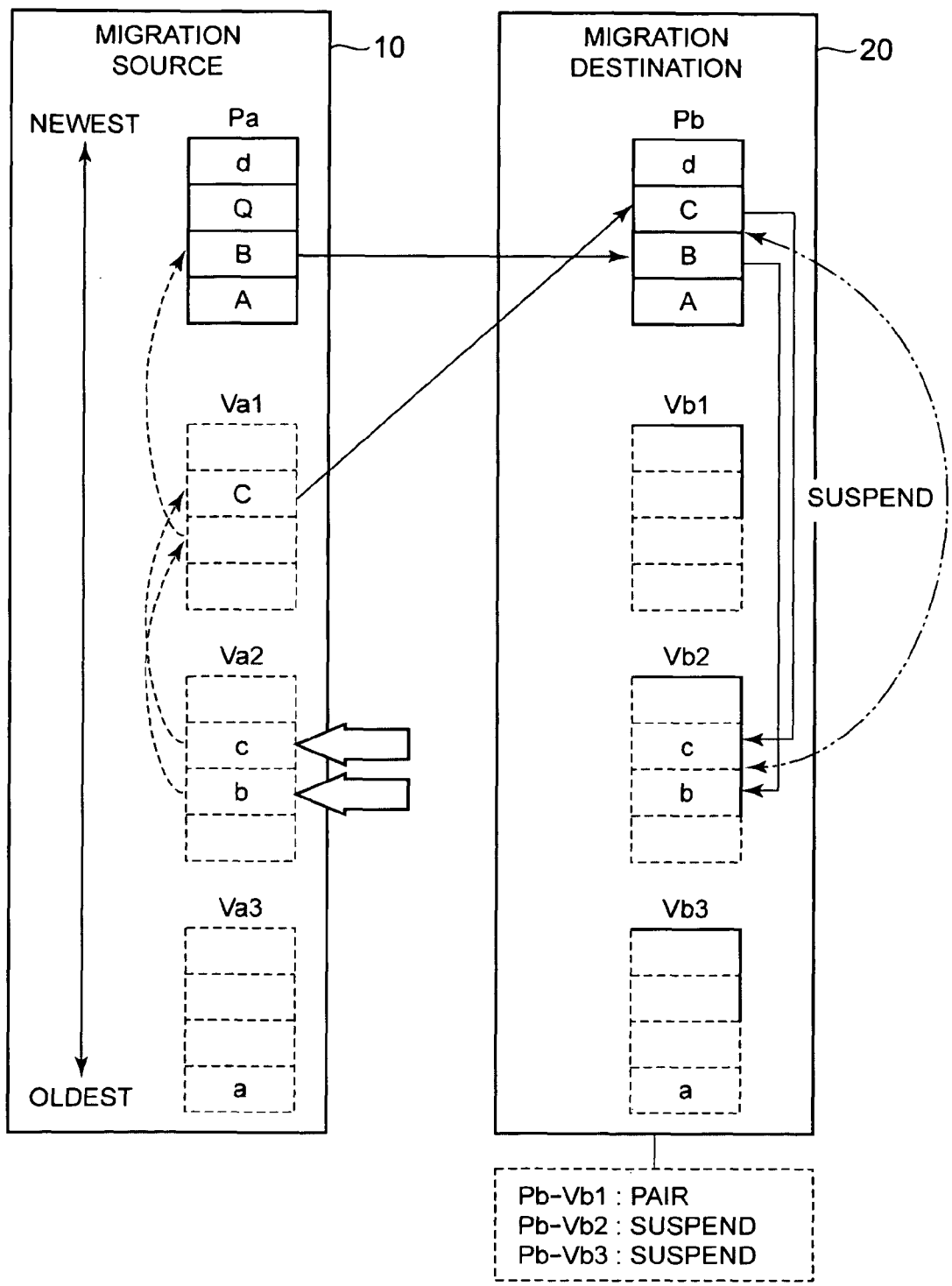
FIG. 12 is a schematic diagram showing how to create a subsequent generation snapshot volume using the migration-destination snapshot function by writing the difference data that is generated in the subsequent generation to the migration-destination volume.

FIG. 12 shows how to migrate the generation (V2) that is one newer than the oldest generation (V3) from the first storage controller 10 to the second storage controller 20. The first controller 110 sets the second snapshot volume 226 (Vb2) corresponding to the migration-targeted generation to the suspend status. Consequently, the contents of the second snapshot volume 226(Vb2) change in accordance with the update generated for the second volume 225.

The first controller 110 detects a block in which a difference is generated between the first snapshot volume of the migration-targeted generation 126(Va2) and the first snapshot volume 126 subsequent thereto (Va1), and copies the data of the first snapshot volume 126(Va1) in which this block is stored to the second volume 225 as difference data.

In the example shown in FIG. 12, data "B" and "C" are written to the second volume 226, and in response to this write, old data "b" and "c" are saved to the second snapshot volume 226(Vb2) corresponding to the migration-targeted generation.

Figure 13:
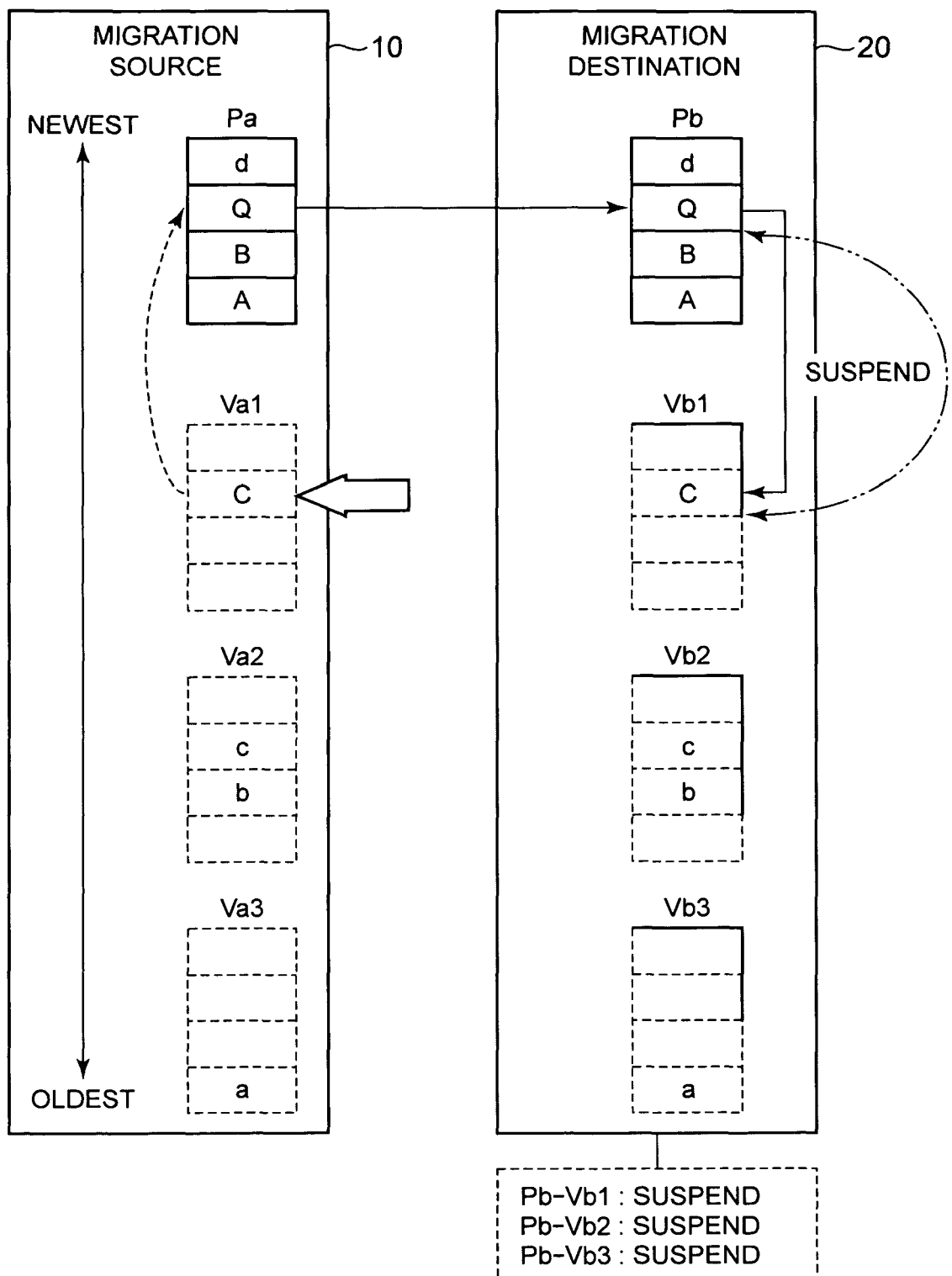
FIG. 13 is a schematic diagram showing how to create a newest generation snapshot volume using the migration-destination snapshot function by writing the difference data that is generated in the newest generation to the migration-destination volume.

FIG. 13 shows the migration of the newest generation. Migration processing is carried out in accordance with the above-described scheme for the newest generation as well. That is, the second snapshot volume 226(Vb1) corresponding to the migration-targeted generation (V1) is set to the suspend status. The first controller 110 reproduces the update generated in the newest generation of the first volume 125 as a difference data write to the second volume 225. In accordance with the difference data write to the second volume 225, the second controller 210 saves the old data to the second snapshot volume 226(Vb1) corresponding to the newest generation.

The same snapshot configuration as the snapshot configuration inside the first storage controller 10 can be created inside the second storage controller 20 by detecting difference data that is generated in the migration-targeted generation, and writing this difference data to the second volume in order from the oldest generation to the newest generation.

Therefore, in this embodiment, it is not necessary to copy snapshot management information stored in the first pool 127 to the second pool 227, or to associate the snapshot management information to the second volume.

Migration processing for the newest generation will be explained next. In this embodiment, data and a snapshot configuration are migrated from the first storage controller 10 to the second storage controller 20 without suspending host 30 access. Therefore, in this embodiment, it is possible for the host 30 to access the first volume 125 when a migration process is in progress. Accordingly, in this embodiment, an access that occurs during a migration process is managed as described below.

Figure 14:
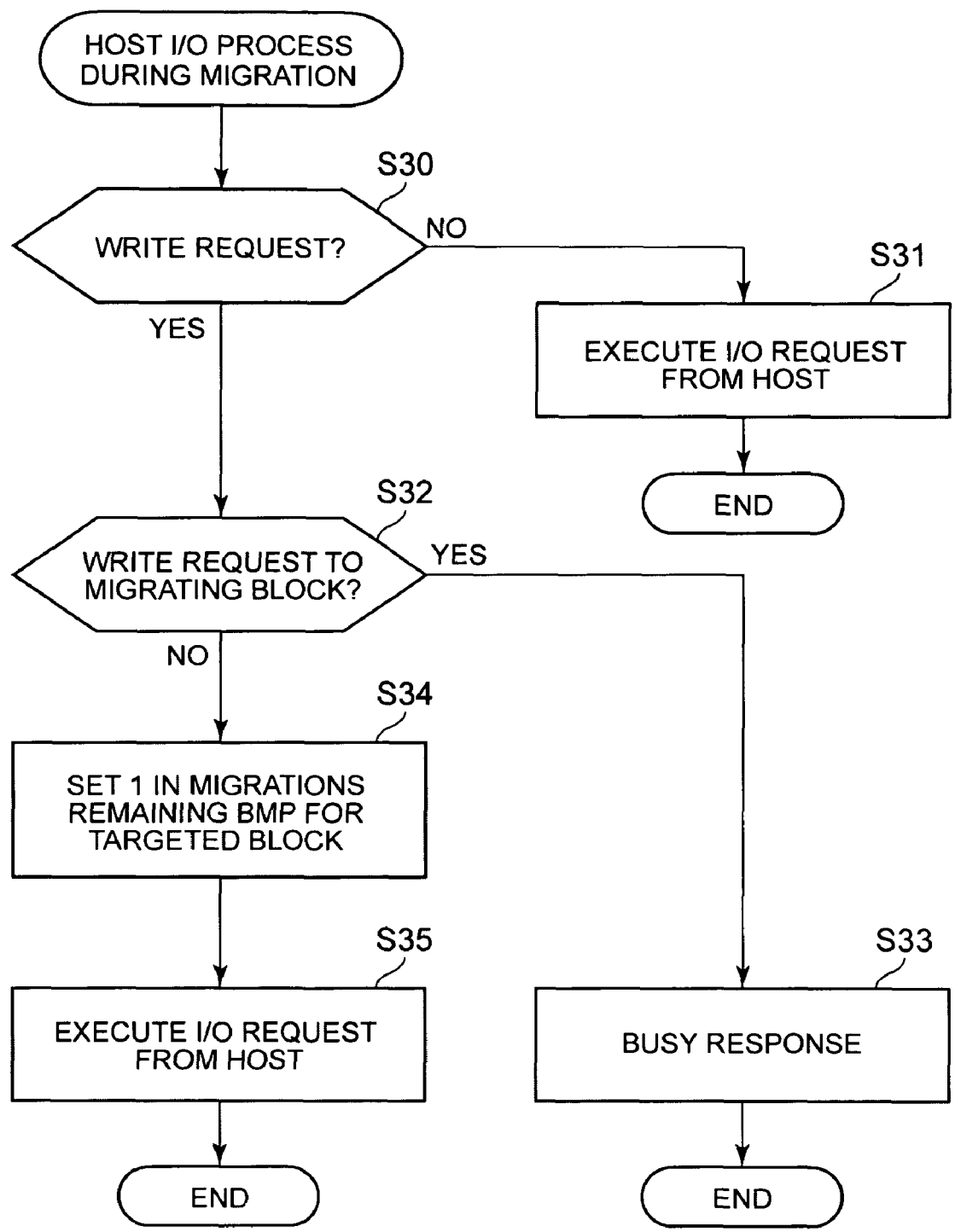
FIG. 14 is a flowchart for processing an access request during migration.

FIG. 14 is a flowchart for processing an access request (I/O request) from the host 30 while a migration process is in progress. The first controller 110 determines whether or not the access request from the host 30 is a write request (S30). When the access request is not a write request (S30: NO), the first controller 110 process the access request from the host 30, and sends the result thereof to the host 30 (S31). That is, when the host 30 issues a read command to the first volume 125 (S30: NO), the first controller 110 reads out the requested data from the first volume 125, and sends this data to the host 30 (S31).

When the access request from the host 30 is a write request (S30: YES), the first controller 110 determines whether or not it is a write request for the block being migrated (S32). When the write request is for the block being migrated (S32: YES), the first controller 110 returns a busy response to the host 30 (S33). The host 30, which receives the busy response, waits for a time, and issues the write request once again.

When the write request is not for the block being migrated (S32: NO), the first controller 110 sets a "1" in the migrations remaining bitmap 134C for the block that is the target of the write request (S34). Then, the first controller 110 process this write request, and returns the result thereof to the host 30 (S35). That is, the first controller 110 updates the data of the target block, and reports to the host 30 to the effect that updating is complete (S35).

FIG. 15 shows the newest generation migration process shown in S20 of FIG. 8. The first controller 110 respectively sets the migration candidate bitmap 134A, the migration-in-progress bitmap 134B, and the migrations remaining bitmap 134C (S40).

The first controller 110 extracts a block in which a difference is generated between the newest generation first snapshot volume 126(Va1) and the first volume 125 (S41). The first controller 110 sets a "1" in the migration candidate bitmap 134A for this extracted block (S42).

The first controller 110 selects one logical block for which a "1" has been set in the migration candidate bitmap 134A (S43). The first controller 110 sets the bit of the migration-in-progress bitmap 134B to "1" for this selected logical block (S44). At the same time, the first controller 110 resets the bit of the migration candidate bitmap 134A for the selected logical block (S45).

The first controller 110 copies the data of the logical block for which a "1" has been set in the migration-in-progress bitmap 134B from the first volume 125 to the second volume 225 (S46). Subsequent to the end of copying, the first controller 110 resets the bit of the migration-in-progress bitmap 134B for the logical block for which copying has ended.

The first controller 110 determines whether or not all the bits of the migration candidate bitmap 134A constitute "0" (S47). When there is a bit of the migration candidate bitmap 134A that is set to "1" (S47: NO), the first controller 110 returns to S44.

When all the bits of the migration candidate bitmap 134A are "0" (S47: YES), the first controller 110 determines whether or not all the bits of the migrations remaining bitmap 134C are "0" (S48).

When all the bits of the migrations remaining bitmap 134C are "0" (S48: YES), this processing ends since no data to be migrated remains. When there is a bit that is set to "1" in the migrations remaining bitmap 134C (S48: NO), the first controller 110 copies the value of the migrations remaining bitmap 134C to the migration candidate bitmap 134A (S49), and returns to S44.

According to the processing shown in FIG. 15, a migration can be carried out from the first storage controller 10 to the second storage controller 20 even for new difference data that is generated during migration. That is, in this embodiment, the snapshot function is run simultaneously in both the first storage controller 10 and the second storage controller 20, making it possible to migrate data and a snapshot configuration while processing an access request from the host 30.

Being configured as described hereinabove, this embodiment exhibits the following effects. A snapshot configuration inside the first storage controller 10 can be automatically created inside the second storage controller 20 by using the snapshot function of the migration-destination second storage controller 20.

Therefore, in this embodiment, data and a snapshot configuration can be migrated in accordance with a write process at least from the first storage controller 10 to the second storage controller 20 without the need to provide a special program in the migration-destination storage controller. Therefore, data and a snapshot configuration can be migrated relatively inexpensively and simply, thereby enhancing the ease-of-use of the user.

In this embodiment, it is possible to migrate data and a snapshot configuration from the first storage controller 10 to the second storage controller 20 without suspending host 30 access to the first storage controller 10. Therefore, a migration can be carried out without the user's awareness, thereby enhancing the usability.

In this embodiment, a migration process can be carried out by the first storage controller 10 and the second storage controller 20 without going through the host 30. Therefore, it is possible to move data and a snapshot configuration from the first storage controller 10 to the second storage controller 20 without placing a burden on the host 30, thereby enhancing the ease-of-use of the user.

Furthermore, the present invention is not limited to the embodiment described hereinabove. A person having ordinary skill in the art can make various additions and changes without departing from the scope of the present invention.

What is claimed is:

1. A storage system, which comprises a first storage controller and a second storage controller, the first storage controller comprising:

a first volume, which is used by a host computer;

a first pool volume;

a first snapshot controller, which: providing a first snapshot volume and a second snapshot volume to the host computer, the first snapshot volume logically storing the storage contents of the first volume at a first point in time, the second snapshot volume logically storing the storage contents of the first volume at second point in time, the second point in time is later than the first point in time; saving update-targeted data and an update location of the first volume in the first pool volume when the first volume is updated; and relating saved update-targeted data and update location to the first snapshot volume and the second snapshot volume, the second storage controller comprising:

a second volume;

a second pool volume; and a second snapshot controller, which: providing at least one snapshot volume which logically storing the storage contents of the first volume at a point in time to the host computer; saving update-targeted data and an update location in the second volume in the second pool volume when the second volume is updated; and relating saved update-targeted data and update location to the at least one snapshot volume, the storage system further comprising:

a migration controller for migrating data and a snapshot-related configuration from the first storage controller to the second storage controller, the migration controller configured to:

generate a third snapshot volume corresponding to the first snapshot volume and a forth snapshot volume corresponding to the second snapshot volume;

detect difference data between the contents of the first snapshot volume and content of the present first volume;

send the contents of the first snapshot volume from the first storage controller to the second storage controller as an update request to the second volume, the contents of the first snapshot volume provided with the data stored in the first volume and detected difference data stored in the first pool volume;

detect difference data between the contents of the second snapshot volume and the content of the first snapshot volume;

send the detected difference data between the contents of the second snapshot volume and the content of the first snapshot volume from the first storage controller to the second storage controller as an update request to the second volume, while the status between the second volume and the third snapshot volume is suspend status and the status between the second volume and the forth snapshot volume is pair status, so that the update-targeted data and the update location in the second volume to be saved in the second pool volume by the second snapshot controller in response to the update of the second logical volume with the difference data between the contents of the second snapshot volume and the content of the first snapshot volume sent from the first storage is not related to the forth snapshot volume but the third snapshot volume.

2. The storage system according to claim 1, wherein the migration controller creates in advance the second volume and the second snapshot volume inside the second storage controller by issuing a prescribed indication to the second storage controller.

3. The storage system according to claim 2, wherein the migration controller configures the relationship between the second volume and the second snapshot volume to a pair status for suspending difference management, and changes the relationship between the second volume and the second snapshot volume to a suspend status for executing difference management.

4. The storage system according to claim 1, wherein when an update request is issued from the host computer while the difference data related to the first snapshot volume is being migrated to a second snapshot volume, the migration controller manages new difference data which is generated in accordance with this update request, and writes the new difference data to the second snapshot volume.

5. The storage system according to claim 4, when the host computer requests an update for the difference data being migrated from the first snapshot volume to the second snapshot volume, the migration controller returns a busy response to the host computer, and when the host computer requests an update for the difference data other than the difference data being migrated, the migration controller manages the difference data related to the update request for the difference data other than the difference data being migrated as the new difference data.

6. The storage system according to claim 5, wherein the migration controller can use a management table for managing the difference data being migrated, and can use a separate management table for managing the new difference data.

7. The storage system according to claim 1, wherein the migration controller is disposed in either one of the first storage controller or the second storage controller.

8. The storage system according to claim 1, wherein the first storage controller and the second storage controller comprise a plurality of storage devices which are non-replaceably fixed inside an enclosure.

9. A snapshot configuration migration method for migrating data and a snapshot-related configuration from a first storage controller to a second storage controller, the snapshot configuration migration method comprising:

a preparation step of creating, inside the second storage controller, a second volume corresponding to a first volume inside the first storage controller, and a second snapshot volume corresponding to a first snapshot volume of the first storage controller;

a generation step for generating a third snapshot volume corresponding to the first snapshot volume and a forth snapshot volume corresponding to the second snapshot volume;

a difference data detection step of detecting difference data between the contents of the first snapshot volume and content of the present first volume, and detecting the difference data between the contents of the second snapshot volume and the content of the first snapshot volume;

a copying step of writing the detected difference data to the second volume by transferring same from the first storage controller to the second storage controller while the status between the second volume and the third snapshot volume is suspend status and the status between the second volume and the forth snapshot volume is pair status.

10. The snapshot configuration migration method according to claim 9, further comprising a step of managing an update request issued by a host computer during migration, detecting new difference data related to this update request, and writing this new difference data to the second snapshot volume.

11. A snapshot configuration migration method for migrating data and a snapshot-related configuration from a first storage controller to a second storage controller, the snapshot configuration migration method comprising:

a preparation step of creating, inside the second storage controller, a second volume corresponding to a first volume inside the first storage controller, and a second snapshot volume corresponding to a first snapshot volume of the first storage controller, and of configuring the relationship between the second volume and the second snapshot volume to a pair status for suspending difference management;
a generation step for generating a third snapshot volume corresponding to the first snapshot volume and a fourth snapshot volume corresponding to the second snapshot volume;
a status change step of changing the relationship between the second volume and the second snapshot volume to a suspend status for executing difference management;
a difference data detection step of detecting difference data between the contents of the first snapshot volume and content of the present first volume, and detecting the difference data between the contents of the second snapshot volume and the content of the first snapshot volume;
a detection data transfer step of transferring the detected difference data from the first storage controller to the second storage controller;
a saving step of copying and saving old data updated by the difference data to the second snapshot volume by using the snapshot function of the second storage controller, prior to writing the difference data to the second volume;
a copying step of writing the difference data to the second volume while the status between the second volume and the third snapshot volume is suspend status and the status between the second volume and the forth snapshot volume is pair status.

* * * * *